US012745203B2

(12) United States Patent
Kuang et al.

(10) Patent No.: US 12,745,203 B2
(45) Date of Patent: Sep. 22, 2026

(54) USER EQUIPMENT, BASE STATION, AND AMF SYSTEM

(71) Applicant: Panasonic Intellectual Property Corporation of America, Torrance, CA (US)

(72) Inventors: Quan Kuang, Langen (DE); Hidetoshi Suzuki, Kanagawa (JP); Ming-Hung Tao, Frankfurt am Main (DE); Akihiko Nishio, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 517 days.

(21) Appl. No.: 18/040,631

(22) PCT Filed: May 21, 2021

(86) PCT No.: PCT/EP2021/063702
§ 371 (c)(1),
(2) Date: Feb. 3, 2023

(87) PCT Pub. No.: WO2022/028749
PCT Pub. Date: Feb. 10, 2022

(65) Prior Publication Data

US 2024/0031972 A1 Jan. 25, 2024

(30) Foreign Application Priority Data

Aug. 6, 2020 (EP) .................................... 20189898

(51) Int. Cl.
*H04W 60/04* (2009.01)
*H04W 84/06* (2009.01)

(52) U.S. Cl.
CPC ........... *H04W 60/04* (2013.01); *H04W 84/06* (2013.01)

(58) Field of Classification Search
CPC ..... H04W 60/04; H04W 84/06; H04W 64/00; H04W 84/005; H04W 88/02;
(Continued)

(56) References Cited

U.S. PATENT DOCUMENTS 11,296,782 B2 * 4/2022 Edge .................. H04B 7/18545
2013/0095862 A1 * 4/2013 Bejerano ............... H04W 68/02
455/458
(Continued)

FOREIGN PATENT DOCUMENTS

WO WO-2009016035 A1 * 2/2009 .......... H04W 64/006
WO WO-2020092561 A1 * 5/2020 ........... H04B 7/1851

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 v15.6.0, Jun. 2019. (99 pages).

(Continued)

*Primary Examiner* — Wesley L Kim
*Assistant Examiner* — Erkin Abdullaev
(74) *Attorney, Agent, or Firm* — Seed Intellectual Property Law Group LLP

(57) ABSTRACT

Provided are a user equipment (UE), a base station, and an AMF (Access and Mobility Management Function) system, as well as corresponding methods and integrated circuits. The UE determines, based on a signal strength measurement or a position in combination with either of a list of cell IDs of earth moving cells and a timing or a stored mapping between geographical areas and tracking areas whether the UE is located in a registration area that has been indicated to the UE by the AMF and in which the UE is paged by the base station.

6 Claims, 15 Drawing Sheets

(58) Field of Classification Search
CPC ..... H04W 88/08; H04W 60/00; H04W 76/11; H04W 8/186; H04W 8/205; H04W 48/02; H04W 48/17; H04W 84/042; H04W 12/06
See application file for complete search history.

(56) References Cited

U.S. PATENT DOCUMENTS

| | | | | |
|---|---|---|---|---|
| 2016/0165521 | A1* | 6/2016 | Choi | H04W 48/10<br>455/434 |
| 2017/0223506 | A1* | 8/2017 | Kim | H04W 64/00 |
| 2018/0077660 | A1* | 3/2018 | Ly | H04W 56/001 |
| 2019/0174449 | A1* | 6/2019 | Shan | H04W 60/04 |
| 2020/0137675 | A1* | 4/2020 | Park | H04W 68/005 |
| 2021/0144669 | A1* | 5/2021 | Edge | H04B 7/18545 |

OTHER PUBLICATIONS

3GPP, "3rd Generation Partnership Project; Technical Specification Group Radio Access Network; NR; Physical channels and modulation (Release 15)," 3GPP TS 38.211 v15.3.0, Sep. 2018. (96 pages).
3GPP, "3rd Generation Partnership Project; Technical Specification Group Radio Access Network; NR; Physical channels and modulation (Release 15)," 3GPP TS 38.211 v15.6.0, Jun. 2019. (97 pages).
3GPP, "3rd Generation Partnership Project; Technical Specification Group Radio Access Network; NR; Radio Resource Control (RRC) protocol specification (Release 15)," 3GPP TS 38.331 v15.6.0, Jun. 2019. (519 pages).
3GPP, "3rd Generation Partnership Project; Technical Specification Group Radio Access Network; NR; User Equipment (UE) procedures in Idle mode and RRC Inactive state (Release 15)," 3GPP TS 38.304 v15.3.0, Mar. 2019. (29 pages).
3GPP, "3rd Generation Partnership Project; Technical Specification Group Radio Access Network; NR; User Equipment (UE) procedures in Idle mode and RRC Inactive state (Release 15)," 3GPP TS 38.304 v15.4.0, Jun. 2019. (29 pages).
3GPP, "3rd Generation Partnership Project; Technical Specification Group Radio Access Network; Solutions for NR to support non-terrestrial networks (NTN) (Release 16)," 3GPP TR 38.821 v16.0.0, Dec. 2019. (140 pages).
3GPP, "3rd Generation Partnership Project; Technical Specification Group Radio Access Network; Study on New Radio (NR) to support non-terrestrial networks (Release 15)," 3GPP TR 38.811 v15.2.0, Jul. 2020. (126 pages).
3GPP, "3rd Generation Partnership Project; Technical Specification Group Radio Access Network; Study on New Radio (NR) to support non-terrestrial networks (Release 15)," 3GPP TR 38.811 v15.3.0, Jul. 2020. (126 pages).
3GPP, "3rd Generation Partnership Project; Technical Specification Group Radio Access Network; Study on Scenarios and Requirements for Next Generation Access Technologies; (Release 16)," 3GPP TR 38.913 v16.0.0, Jul. 2020. (40 pages).
3GPP, "3rd Generation Partnership Project; Technical Specification Group Services and System Aspects; System Architecture for the 5G System; Stage 2 (Release 16)," 3GPP TS 23.501 v16.1.0, Jun. 2019. (368 pages).
Extended European Search Report, dated Feb. 23, 2021, for European Application No. 20189898.8. (14 pages).
International Search Report, mailed Aug. 19, 2021, for International Application No. PCT/EP2021/063702. (4 pages).
LG Electronics Inc., "Report on email discussion [106#74][NTN] Cell Selection & reselection," R2-1911297, Agenda Item: 11.6.4.2, 3GPP TSG-RAN WG2 Meeting #107, Prague, Czech Republic, Aug. 26-30, 2019. (16 pages).

* cited by examiner

Transparent satellite

Regenerative satellite

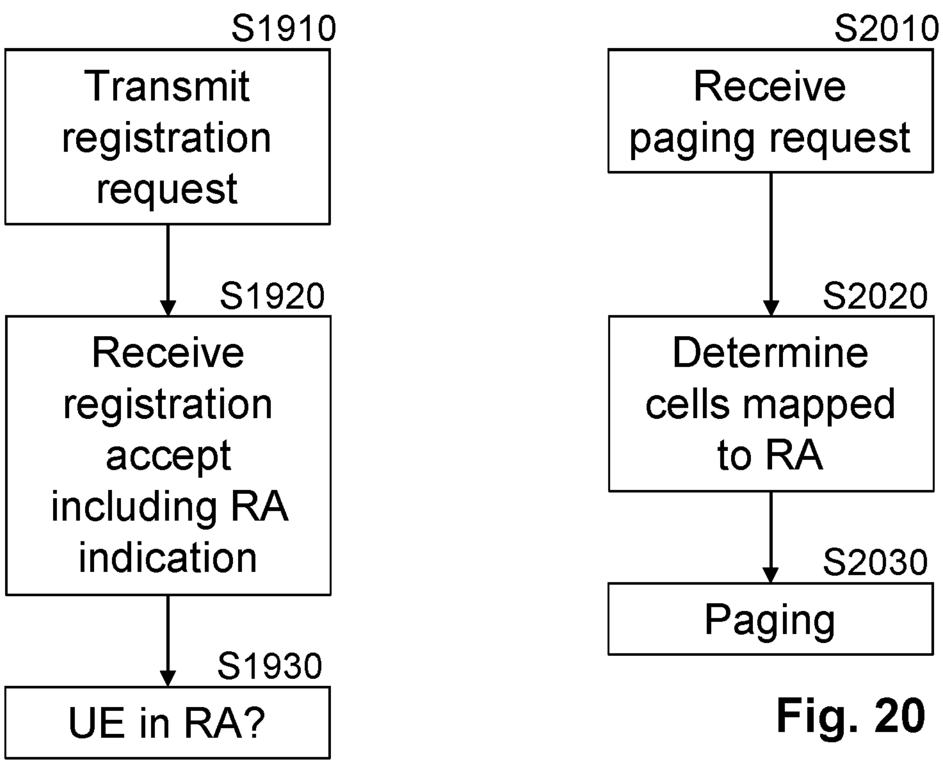
Fig. 19
Fig. 20
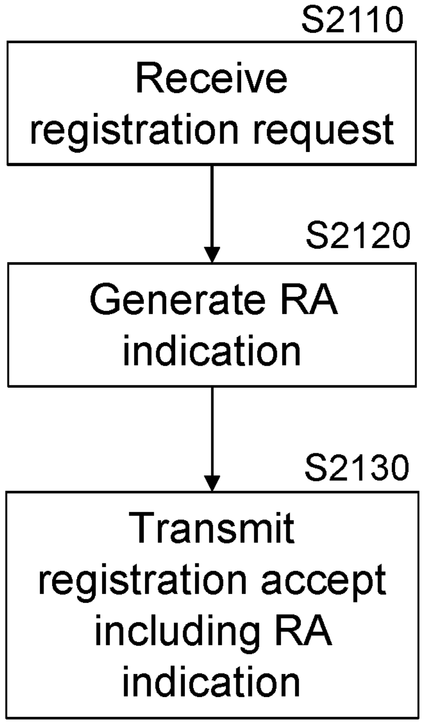
Fig. 21

Cell moving direction

USER EQUIPMENT, BASE STATION, AND AMF SYSTEM

1. TECHNICAL FIELD

The present disclosure relates to transmission and reception of signals in a communication system. In particular, the present disclosure relates to methods and apparatuses for such transmission and reception.

2. DESCRIPTION OF THE RELATED ART

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A).

For systems like LTE, LTE-A, and NR, further modifications and options may facilitate efficient operation of the communication system as well as particular devices pertaining to the system.

SUMMARY

One non-limiting and exemplary embodiment facilitates efficient paging for NTN communication systems with earth moving cells.

In an embodiment, the techniques disclosed herein feature a user equipment, UE, comprising:

- a transceiver, which, in operation,
- transmits a registration request including at least one of:
  - an indication of a first location of the UE, or
  - a cell ID of a last cell that has been visited by the UE and a timestamp indicating a first time instant at which the UE has been located within the last cell, and
- receives a registration accept message including an indication of a registration area, the registration area including the first location of the UE, and
- circuitry, which, in operation, determines, based on:
  - a list of cell IDs of a plurality of earth moving cells or cell sections of the earth moving cells, an indication of a second time instant when the plurality of earth moving cells form the registration area, coverage area information indicating, for each of the plurality of earth moving cells, a coverage area of the cell or cell section relative to a satellite location of a satellite generating the cell and ephemeris data of the satellite, and a measurement of a second location of the UE, wherein the list of the plurality of earth moving cells and the indication of the second time instant are included in the indication of the registration area, or
  - the list of cell IDs, an indication of a time interval when the plurality of earth moving cells or cell sections form the registration area, and a cell ID of a newly visited cell or cell section including the second location of the UE and different from the last cell, wherein the list of cell IDs and the indication of the time interval are included in the indication of the registration area, or
  - the measurement of the second location and a mapping between geographical areas and tracking areas and a list of one or more tracking areas forming the registration area, wherein the mapping is read from a storage, and the list of one or more tracking areas is included in the indication of the registration area,
- whether or not the UE is located in the registration area at the second location.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE FIGURES

In the following exemplary embodiments are described in more detail with reference to the attached figures and drawings.

FIG. 19 is a flow chart of a communication method for a user equipment;

FIG. 20 is a flow chart of a communication method for a base station;

FIG. 21 is a flow chart of a communication method for an AMF;

DETAILED DESCRIPTION

5G NR System Architecture and Protocol Stacks

3GPP has been working at the next release for the 5$^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
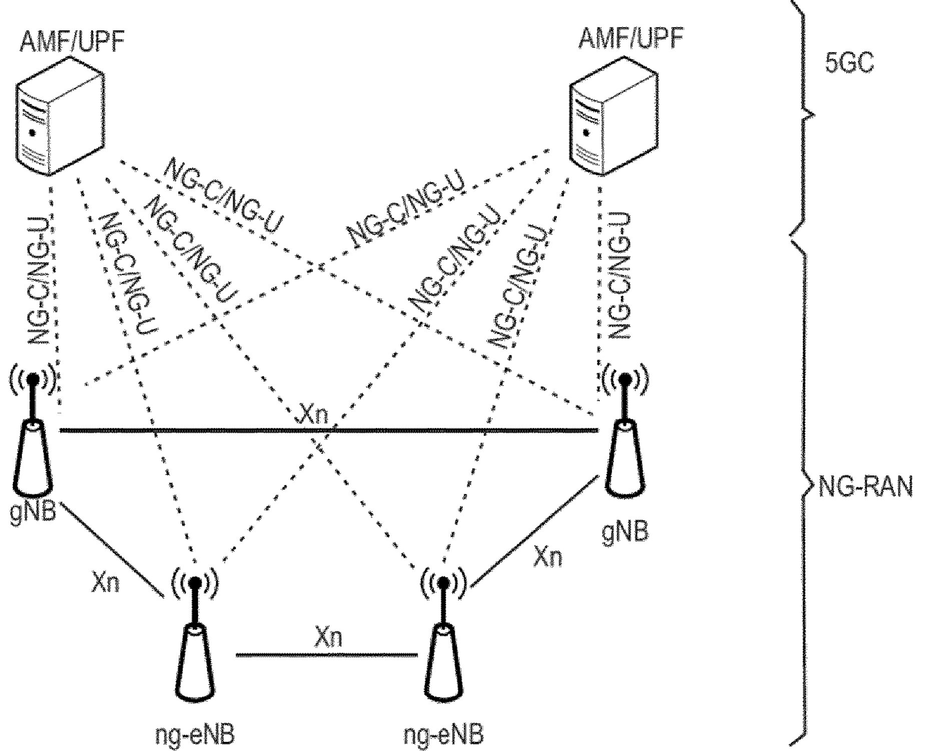
FIG. 1 shows an exemplary architecture for a 3GPP NR system.

Among other things, the overall system architecture assumes an NG-RAN (Next Generation-Radio Access Network) that comprises gNBs (gNodeB), providing the NG-radio access user plane (SDAP/PDCP/RLC/MAC/PHY) and control plane (RRC, Radio Resource Control) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SOAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling--related functions, including handling of different numerologies.

The physical layer (MVO is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1-10^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 2:
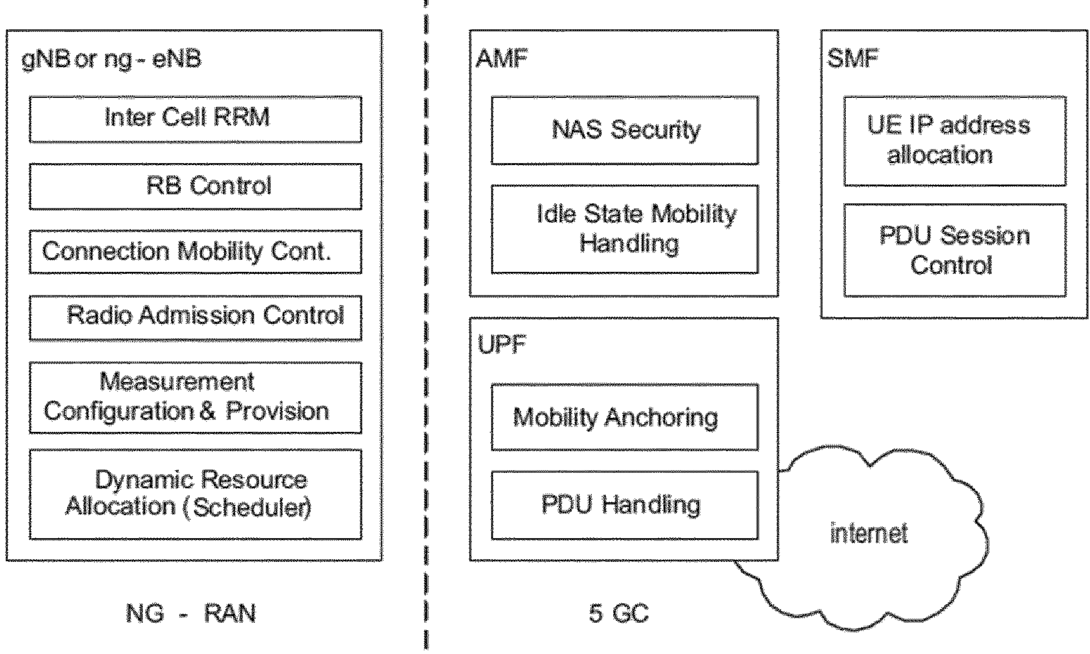
FIG. 2 is a schematic drawing which shows functional split between NG-RAN and 5GC.

FIG. 2 illustrates functional split between NG-RAN and 5GC. NG-RAN logical node is a gNB or ng-eNB (next generation eNB). The 5GC has logical nodes AMF, UPF and SMF.

In particular, the gNB and ng-eNB host the following main functions:

- Functions for Radio Resource Management such as Radio Bearer Control, Radio Admission Control, Connection Mobility Control, Dynamic allocation of resources to UEs in both uplink and downlink (scheduling);
- IP header compression, encryption and integrity protection of data;

- Selection of an AMF at UE attachment when no routing to an AMF can be determined from e information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or OAM);
- Measurement and measurement reporting configuration for mobility and scheduling;
- Transport level packet marking in the uplink;
- Session Management;
- Support of Network Slicing;
- QoS Flow management and mapping to data radio bearers;
- Support of UEs in RRC_INACTIVE state;
- Distribution function for NAS (Non-access stratum) messages;
- Radio access network sharing;
- Dual Connectivity;
- Tight interworking between NR and E-UTRA.

The Access and Mobility Management Function (AMF) hosts the following main functions:

- Non-Access Stratum, NAS, signaling termination;
- NAS signaling security,
- Access Stratum, AS, Security control;
- Inter Core Network, CN, node signaling for mobility between 3GPP access networks;
- Idle mode UE Reachability (including control and execution of paging retransmission),
- Registration Area management;
- Support of intra-system and inter-system mobility;
- Access Authentication;
- Access Authorization including check of roaming rights;
- Mobility management control (subscription and policies);
- Support of Network Slicing;
- Session Management Function, SMF, selection.

Furthermore, the User Plane Function, UPF, hosts the following main functions:

- Anchor point for Intra-/Inter-RAT mobility (when applicable);
- External PDU session point of interconnect to Data Network;
- Packet routing & forwarding;
- Packet inspection and User plane part of Policy rule enforcement;
- Traffic usage reporting;
- Uplink classifier to support routing traffic flows to a data network;
- Branching point to support multi-horned PDU session;
- QoS handling for user plane, e.g., packet filtering, gating, UL/DL, rate enforcement;
- Uplink Traffic verification (SDF to QoS flow mapping);
- Downlink packet buffering and downlink data notification triggering.

Finally, the Session Management function, SMF, hosts the following main functions:

- Session Management;
- UE IP address allocation and management;
- Selection and control of UP function;
- Configures traffic steering at User Plane Function, UPF, to route traffic to proper destination;
- Control part of policy enforcement and QoS;
- Downlink Data Notification.

RRC Connection Setup and Reconfiguration Procedures

Figure 3:
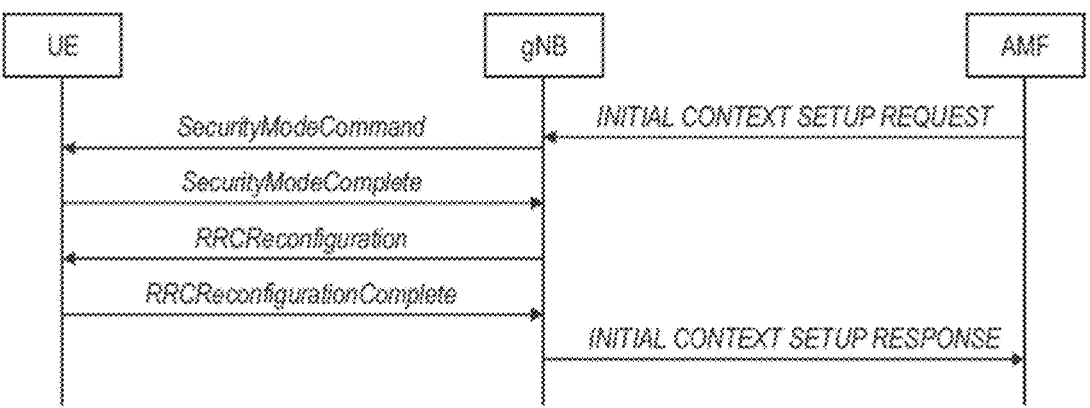
FIG. 3 is a sequence diagram for RRC connection setup/reconfiguration procedures.

FIG. 3 illustrates some interactions between a UE, gNB, and AMF (an 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 4:
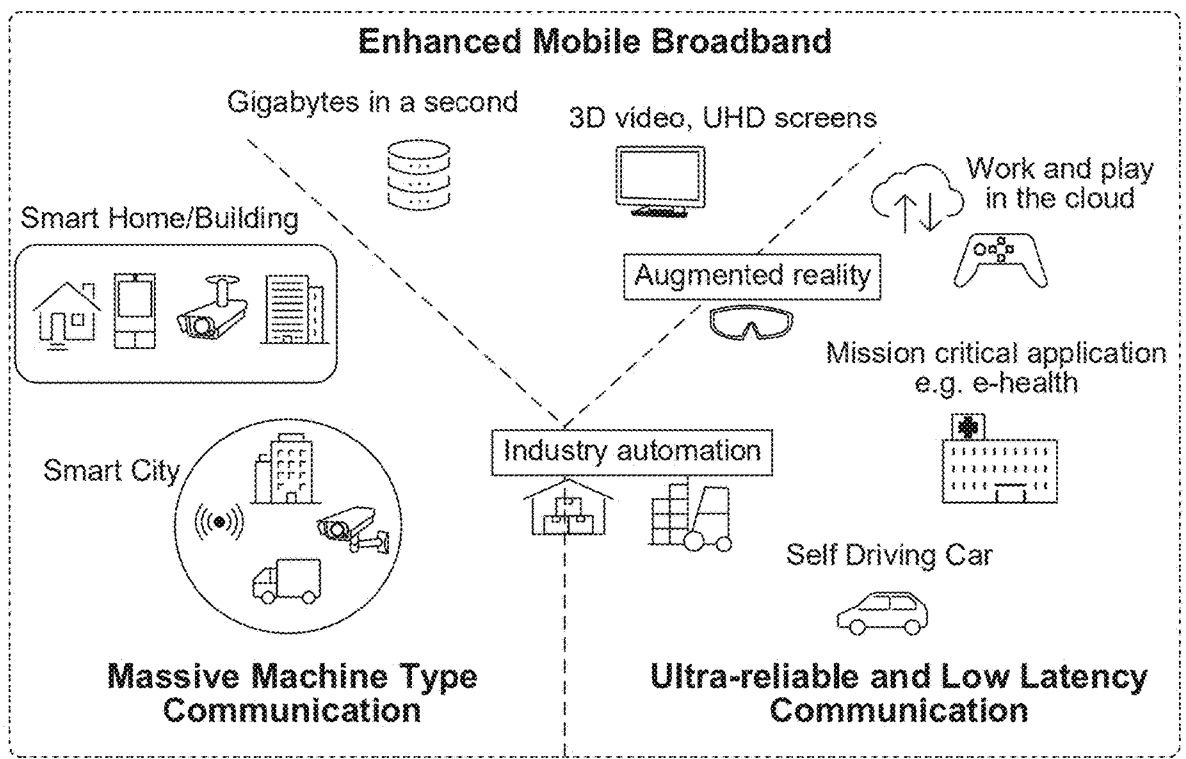
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (URLLC) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see, e.g., FIG. 2 of ITU-R M.2083).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI (Downlink Control Information) formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR, URLLC, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from the physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

In slot-based scheduling or assignment, a slot corresponds to the timing granularity (TTI-transmission time interval) for scheduling assignment. In general, TTI determines the timing granularity for scheduling assignment. One TTI is the time interval in which given signals is mapped to the physical layer. For instance, conventionally, the TTI length can vary from 14-symbols (slot-based scheduling) to 2-symbols (non-slot based scheduling). Downlink (DL) and uplink (UL) transmissions are specified to be organized into frames (10 ms duration) consisting of subframes (1 ms duration). In slot-based transmission, a subframe is further divided into slots, the number of slots being defined by the numerology/subcarrier spacing. The specified values range between 10 slots per frame (1 slot per subframe) for a subcarrier spacing of 15 kHz to 80 slots per frame (8 slots per subframe) for a subcarrier spacing of 120 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.3.0, Physical channels and modulation, 2018-09). However, assignment of time resources for transmission may also be non-slot based. In particular, the rib in non slot-based assignment may correspond to mini-slots rather than slots, i.e., one or more mini-slots may be assign to a requested transmission of data/control signaling. In non slot-based assignment, the minimum length of a TTI may for instance be 1 or 2 OFDM symbols.

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 3. The NG-RAN maps packets belonging to different PDU sessions to different DRB. NAS level packet filters in the UE and in the 5GC associate UL and DL packets with QoS Flows, whereas AS-level mapping rules in the UE and in the NG-RAN associate UL and DL QoS Flows with DRBs.

Figure 5:
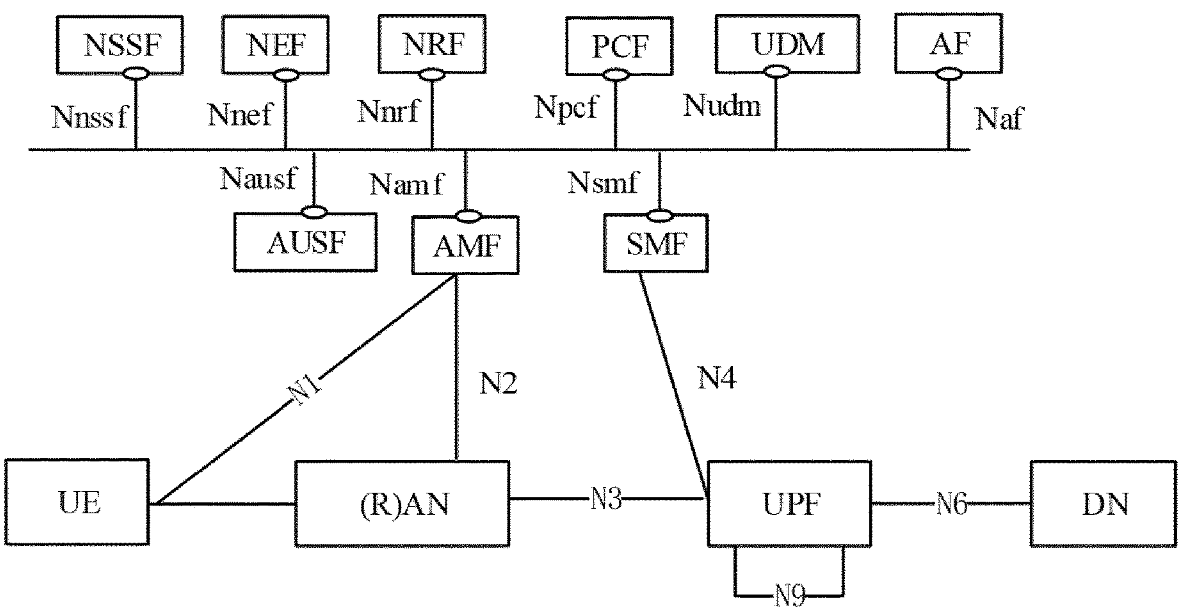
FIG. 5 is a block diagram showing an exemplary 5G system architecture for a non-roaming scenario.

FIG. 5 illustrates a 5GC NR non-roaming reference architecture (see TS 23.501 v16.1.0, section 4.23). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMMB and mMTC services to at least one of functions (for example NEF, AMF, SMF, PCF, UPF, etc.) of the 5GC to establish a PDU session including a radio bearer between a gNodeB and a UE in accordance with the QoS requirement and control circuitry, which, in operation, performs the services using the established PDU session.

A terminal is referred to in the LTE and NR as a user equipment (UE). This may be a mobile device or communication apparatus such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node or scheduling node, e.g., forming a part of the network for providing services to terminals. A base station is a network node, which provides wireless access to terminals.

FIGS. 6 to 9 illustrate some additional examples of interaction of the AMF with a UE and an NG-RAN node, e.g., gNB) to the examples from FIG. 3.

Figure 6:
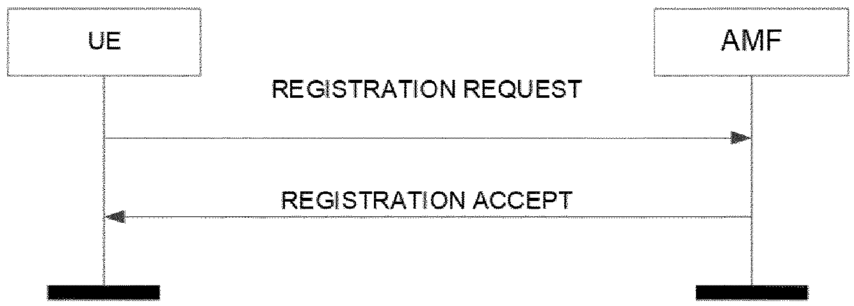
FIG. 6 illustrates a registration procedure.

In particular, FIG. 6 shows a registration procedure, where a registration request is transmitted from the UE to the AMF, and a registration accept message is transmitted by the AMF in response. For instance, the UE initiates the registration procedure, e.g., for initial registration, mobility registration update, or periodic registration update.

Figure 7:
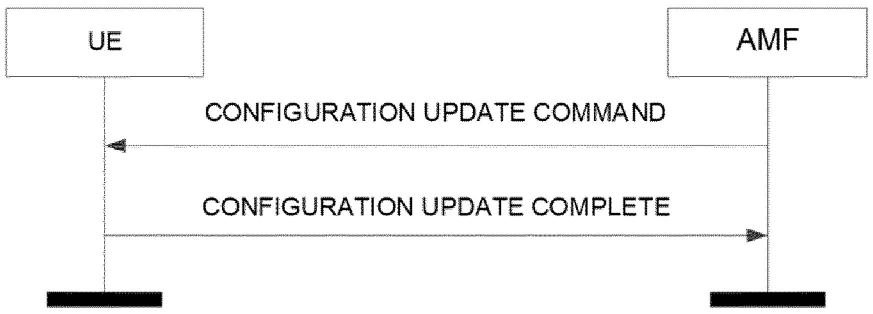
FIG. 7 illustrates a UE configuration update procedure.

On the other hand, the AMF may initiate a UE configuration update procedure, as shown in FIG. 7, for example, if the AMF wants to update the UE configuration for access and mobility related parameters. As shown in FIG. 7, the AMF transmits a configuration update command, to which the UE responds with a configuration update complete message.

Figure 8:
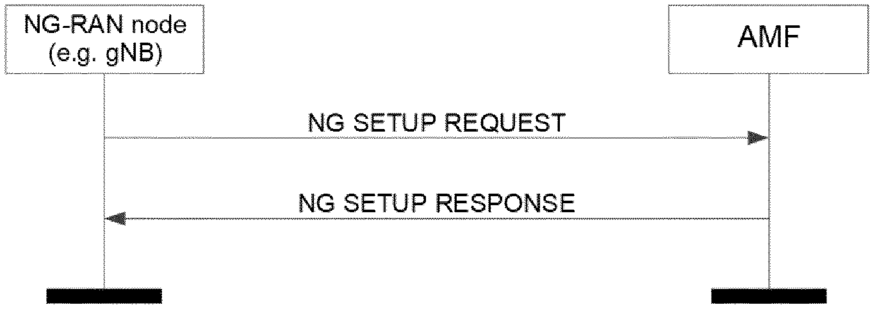
FIG. 8 illustrates an NG setup procedure.

An NG setup procedure between an NG-RAN node and the AMF is shown in FIG. 8. In particular, the NG-RAN node (e.g., gNB) transmits an NG setup request to the AMF and receives from the AMF an NG setup response. The NG setup procedure may be used to exchange application level data (e.g., configuration data) needed for the NG-RAN node and AMF to correctly interoperate on the NG interface.

Figure 9:
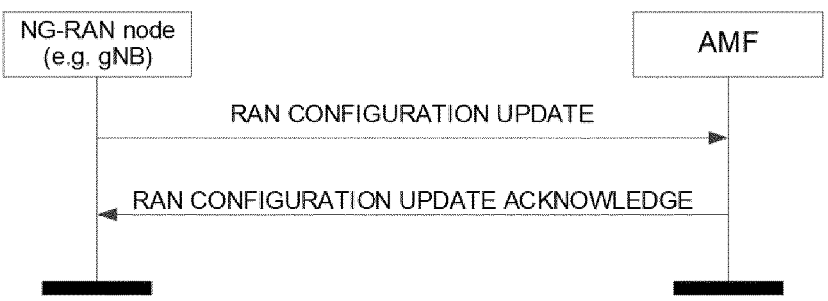
FIG. 9 illustrates a RAN configuration update procedure.

Further, a RAN configuration update procedure may be used to update application level configuration data needed for the NG-RAN node and AMF to interoperate correctly on the NG interface. As shown in FIG. 9, the RAN configuration update procedure may comprise the NG-RAN node sending a RAN configuration update and receiving a RAN configuration update acknowledge in response.

RRC States

In wireless communication systems including NR, a device or communication apparatus (e.g., UE) can be in different states depending on traffic activity. In NR, a device can be in one of three RRC states, RRC_IDLE, RRC_CONNECTED, and RRC_INACTIVE. The first two RRC states, RRC_IDLE and RRC_CONNECTED, are similar to the counterparts in LTE, while RRC_INACTIVE is a new state introduced in NR and not present in the original LTE design. There are also core network states, CN_IDLE and CN_CONNECTED, depending on whether the device has established a connection with the core network or not.

In RRC_IDLE, there is no RRC context—that is, the parameters necessary for communication between the device and the network in the radio-access network and the device does not—belong to a specific cell. From a core network perspective, the device is in the CN_IDLE state. No data transfer may take place as the device sleeps most of the time to reduce battery consumption. In the downlink, devices in idle state periodically wake up to receive paging messages, if any, from the network. Mobility is handled by the device through cell reselection. Uplink synchronization is not maintained and hence the only uplink transmission activity that may take place is random access, e.g., to move to a connected state. As part of moving to a connected state, the RRC context is established in both the device and the network.

In RRC_CONNECTED, the RRC context is established and all parameters necessary for communication between the device and the radio-access network are known to both entities. From a core network perspective, the device is in the CN_CONNECTED state. The cell to which the device belongs is known and an identity of the device, the Cell Radio-Network Temporary Identifier (C-RNTI), used for signaling purposes between the device and the network, has been configured. The connected state is intended for data transfer to/from the device, but discontinuous reception (DRX) can be configured to reduce device power consumption. Since there is an RRC context established in the gNB in the connected state, leaving DRX and starting to receive/transmit data is relatively fast as no connection setup with its associated signaling is needed. Mobility is managed by the radio-access network, that is, the device provides neighboring-cell measurements to the network which commands the device to perform a handover when relevant. Uplink time alignment may or may not exist but need to be established using random access and maintained for data transmission to take place.

In LTE, only idle and connected states are supported. A common case in practice is to use the idle state as the primary sleep state to reduce the device power consumption. However, as frequent transmission of small packets is common for many smartphone applications, the result is a significant amount of idle-to-active transitions in the core network. These transitions come at a cost in terms of signaling load and associated delays. Therefore, to reduce the signaling load and in general reduce the latency, a third state is defined in NR, the RRC_INACTIVE state.

In RRC_INACTIVE, the RRC context is kept in both the device and the gNB. The core network connection is also kept, that is, the device is in CN_CONNECTED from a core network perspective. Hence, transition to connected state for data transfer is fast. No core network signaling is needed. The RRC context is already in place in the network and idle-to-active transitions can be handled in the radio-access network. At the same time, the device is allowed to sleep in a similar way as in the idle state and mobility is handled through cell reselection, that is, without involvement of the network. Accordingly, the mobility of the communication apparatus or device is device controlled rather than network controlled, and the communication apparatus is capable of contacting the network through random access. Thus, RRC_INACTIVE can be seen as a mix of the idle and connected states (for further details, see E. Dahlman, et al., 5G NR: The Next Generation Wireless Access Technology, 1st Edition, sections 6.5.1 to 6.5.3).

Paging Procedures in 5G NR

An exemplary implementation of the paging function in 5G NR that involves PDCCH monitoring, according to the currently standardized version, will be explained in a simplified and abbreviated form in the following.

There are two different paging procedures in 5G NR, a RAN-based paging procedure (e.g., based on RAN-based notification areas) and a core-network-based paging procedure (see for instance 3GPP TS 38.300 v15.6.0, TS 38.304 v15.4.0, and TS 38.331 v15.6.0 referring to RAN paging and CN paging in several sections thereof, such as section 9.2.5 "Paging" in TS 38.300).

Paging allows the network to reach UEs in RRC_IDLE and RRC_INACTIVE state through Paging messages, and to notify UEs in RRC_IDLE, RRC_INACTIVE, and RRC_CONNECTED state of system information change and public warning information (such as ETWS/CMAS, Earthquake and Tsunami Warning System/Commercial Mobile Alert System) indications through Short Messages. Both the paging messages and the Short Messages are addressed with P-RNTI on the PDCCH to be monitored by the UE. But while the actual paging messages (e.g., with the paging records) are then sent on PCCH (as indicated by the PDCCH), the Short Messages can be sent over PDCCH directly.

While in RRC_IDLE the UE monitors the paging channels for CN-initiated paging, in RRC_INACTIVE the UE also monitors paging channels for RAN-initiated paging. A UE need not monitor paging channels continuously though; Paging DRX is defined where the UE in RRC_IDLE or RRC_INACTIVE is only required to monitor paging channels during one Paging Occasion (PO) per DRX cycle (see 3GPP TS 38.304 v15.3.0, e.g., sections 6.1 and 7.1). The Paging DRX cycles are configured by the network.

The POs of a UE for CN-initiated and RAN-initiated paging are based on the same UE ID, resulting in overlapping POs for both. The number of different POs in a DRX cycle is configurable via system information, and a network may distribute UEs to those POs based on their IDs. A PO is a set of PDCCH monitoring occasions and can consist of multiple time slots (e.g., subframe or OFDM symbol) where paging DCI can be sent. One Paging Frame (PF) is one Radio Frame and may contain one or multiple PO(s) or starting point of a PO.

When in RRC_CONNECTED, the UE monitors the paging channels in any PO signaled in system information for a System Information (SI) change indication and/or a PWS (Public Warning System) notification. In case of Bandwidth Adaptation (BA) (see section 6.10 in TS 38.300), a UE in RRC_CONNECTED only monitors paging channels on the active BWP with common search space configured.

When the UE receives a paging message, the PDCCH monitoring can be stopped by the UE. Depending on the paging cause, the UE may continue with, e.g., obtaining system information, or establishing the RRC connection with the base station and then receiving the traffic/instruction from the network.

Tracking Area and Tracking Area Code

Since the location of a UE is typically known on a cell level, a paging message is typically transmitted across multiple cells in the so-called tracking area (TA), which may be controlled by the AMF/MME (Mobility Management Entity).

A group of neighboring gNBs may be defined as a TA. This definition may be performed, for instance, at an initial deployment of a network, wherein each gNB may be configured with its own TA. A tracking area code (TAC) is a unique code that is assigned to each of the TAs.

As the network has to have updated location information about UEs in RRC_IDLE to find out in which TA a particular UE is located, the UE may notify the network of its current location by sending a tracking area update (TAU) message every time it moves between TAs.

For this purpose, when a UE attaches to a network, a list indicating TAs where the network believes the UE is located is obtained. When moving within the TAs indicated by said list, a TAU procedure is not required to be performed. However, when the UE moves to within a TA not indicated by said list, a TAU procedure is initiated.

Further, a UE in RRC_IDLE may send TAU messages on a regular basis in a periodic manner, even when the UE stays within the same TA. By providing TAU messages regularly, the network may be informed that the UE is still available and may receive data.

The tracking area code associated with a cell may be broadcast by a respective gNB in system information.

Registration Area

As described above, Tracking Areas (TAs) are used to track the UE mobility in a core-network level (e.g., by AMF) in order to page the UE efficiently when the UE is idle. Each UE is assigned a Registration Area (RA) containing a list of TAI (tracking area identifiers) by the core network (e.g., as the above-mentioned list of TAs). In general, the registration area is UE specific and may be different for different UEs even at similar locations (e.g., for reasons of load balancing).

When the core network needs to page the UE (e.g., there is downlink data to be transmitted to the UE), it transmits a paging message to the one or more gNBs, and the gNB or gNBs perform paging of the UE over every cell that belongs to the registration area.

Figure 10:
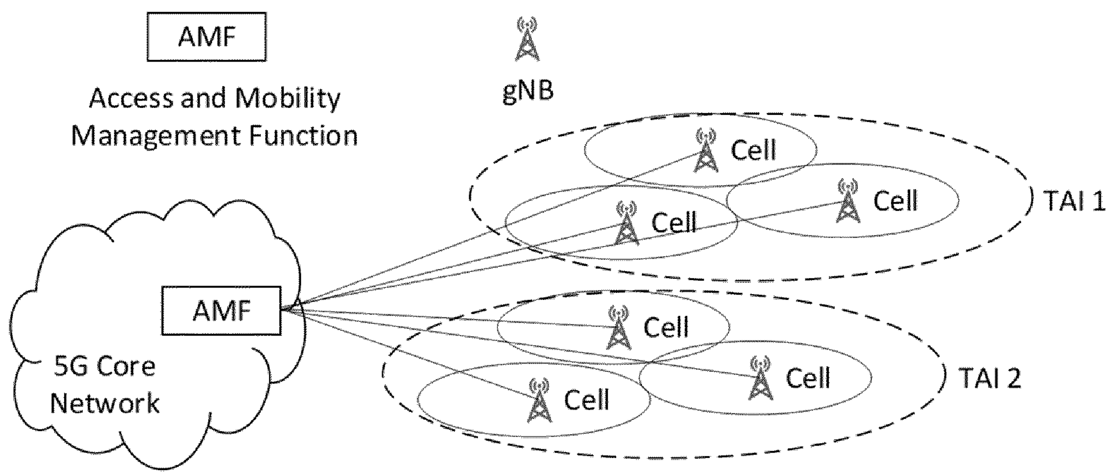
FIG. 10 is a schematic drawing illustrating the relationship between registration area, tracking area, and cells.

The relationship of registration area, tracking areas, and cells is illustrated in FIG. 10, where both tracking areas TAI1 and TAI2 contain a plurality of cells. For instance, the registration area assigned to a UE may be Registration area={TAI1, TAI2}. In this example, a gNB serves a single cell. However, the present disclosure is not limited to a particular relationship between gNBs (or base stations) and cells, and a gNB may also serve a plurality of cells.

When the UE moves to a cell outside the area defined by the RA, it needs to access the network and perform a mobility registration update procedure. In the mobility update procedure, where the registration procedure shown in FIG. 6 may be used, the UE reports the TAI to the network via REGISTRATION REQUEST message. The core network then provides the UE with a new TAI list that includes the new TAI in the REGISTRATION ACCEPT message. Thus, the UE is assigned a new registration area.

Accordingly, when moving to a new cell, a UE needs to determine whether it is within the same RA or not. To know whether or not it still within the same RA, the UE considers the TAC associated with the cell. Each cell broadcasts its associated TAC (Tracking Area Code of the TA to which the cell belongs) and the PLMN ID (public land mobile network identity) in the system information (e.g., SIB1, system information block 1). When the UE visits a new cell or camps on a new cell, it reads the system information to derive the TAI by cascading TAC with PLMN ID or appending the TAC to the PLMN ID (TAI=PLMN ID+TAC). Then, the UE compares the derived TAI with the list of TAIs in the RA. Herein, "camping" on a cell includes at least one of starting to monitor the paging, reading the SIBs from the cell, and performing a measurement using the RS from the cell.

Non-Terrestrial Networks (NTNs)

In 3GPP, NR-based operation in a non-terrestrial network (NTN) is studied and described (see, e.g., 3GPP TR 38.811, Study on New Radio (NR) to support non-terrestrial networks, version 15.2.0, and 3GPP TR 38.821, Solutions for NR to support non-terrestrial networks, version 16.0.0).

A non-terrestrial network refers to a network, or segment of networks using RF resources on board of a satellite, for instance. NTNs typically feature the following system elements: an NTN terminal, which may refer to a 3GPP UE or a terminal specific to the satellite system in case a satellite does not serve directly 3GPP UEs; a service link which refers to the radio link between the user equipment and the space/airborne platform; an airborne platform embarking a payload; gateways that connect the space/airborne platform to the core network; feeder links which refer to the radio links between the gateway and space/airborne platform.

Figure 11:
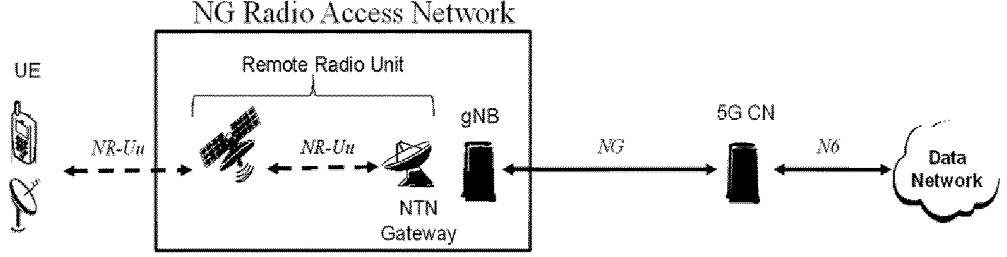
FIG. 11 illustrates a scenario of a non-terrestrial network (NTN), wherein a transmission between a terminal is performed via a remote radio unit including a satellite and an NTN gateway.

FIG. 11 illustrates a scenario of a non-terrestrial network, wherein a transmission between a terminal (UE) is performed via a remote radio unit including a satellite and an NTN gateway. A gNB is located at the gateway as a scheduling device. The satellite payload implements frequency conversion and radiofrequency amplifier in both uplink and downlink direction. Hence, the satellite repeats the NR radio interface from the feeder link (between the NTN gateway and the satellite) to the service link (between the satellite and the UE) and vice versa. A satellite in this configuration is referred to as a transparent satellite.

Figure 12:
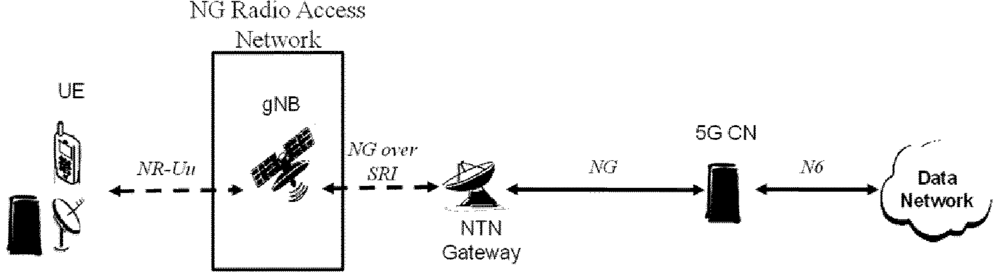
FIG. 12 illustrates a scenario of a non-terrestrial network, wherein a transmission between a terminal is performed via a satellite including a gNB as a scheduling device.

FIG. 12 illustrates a scenario of a non-terrestrial network, wherein a transmission between a terminal (UE) is performed via a satellite including a gNB as a scheduling device. A satellite in this configuration is referred to as a regenerative satellite.

In NTN, there may be different kinds of platforms, including satellites and UAS (Unmanned Aerial System) platforms, examples of which are listed in Table 1 (corresponding Table 4.1-1 of 3GPP TR 38.821, see also 3GPP TR 38.821, Section 4.1. Non-Terrestrial Networks overview):

TABLE 1

Types of NTN Platforms

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position fixed in terms of elevation/azimuth | 200-3500 km |
| UAS platform (including High Altitude Platform Station (HAPS)) | 8-50 km (20 km for HAPS) | with respect to a given earth point | 5-200 km |
| High Elliptical Orbit (HEO) satellite | 400-50000 km | Elliptical around the earth | 200-3500 km |

Thanks to the wide service coverage capabilities and reduced vulnerability of space/airborne vehicles to physical attacks and natural disasters, NTNs may foster the rollout of NR service in unserved areas that cannot be covered by terrestrial NR networks (for instance isolated or remote areas, on board aircraft or vessels) and unserved (for instance suburban and rural areas). Further, NTNs may reinforce NR service reliability by providing service continuity for passengers on moving platforms or ensuring service availability anywhere, especially for critical communication.

The benefits relate to either non-terrestrial networks operating alone or to integrated terrestrial and non-terrestrial networks, which may impact coverage, user bandwidth, system capacity, service reliability or availability.

For LEO, MEO, and HEO satellites, which do not keep a their position fixed with respect to a given earth point, a satellite beam, which corresponds to a cell or PCI (Physical Cell ID) or to an SSB (Synchronization Signal Block) beam of the NR wireless system may be moving over the earth.

Figure 13:
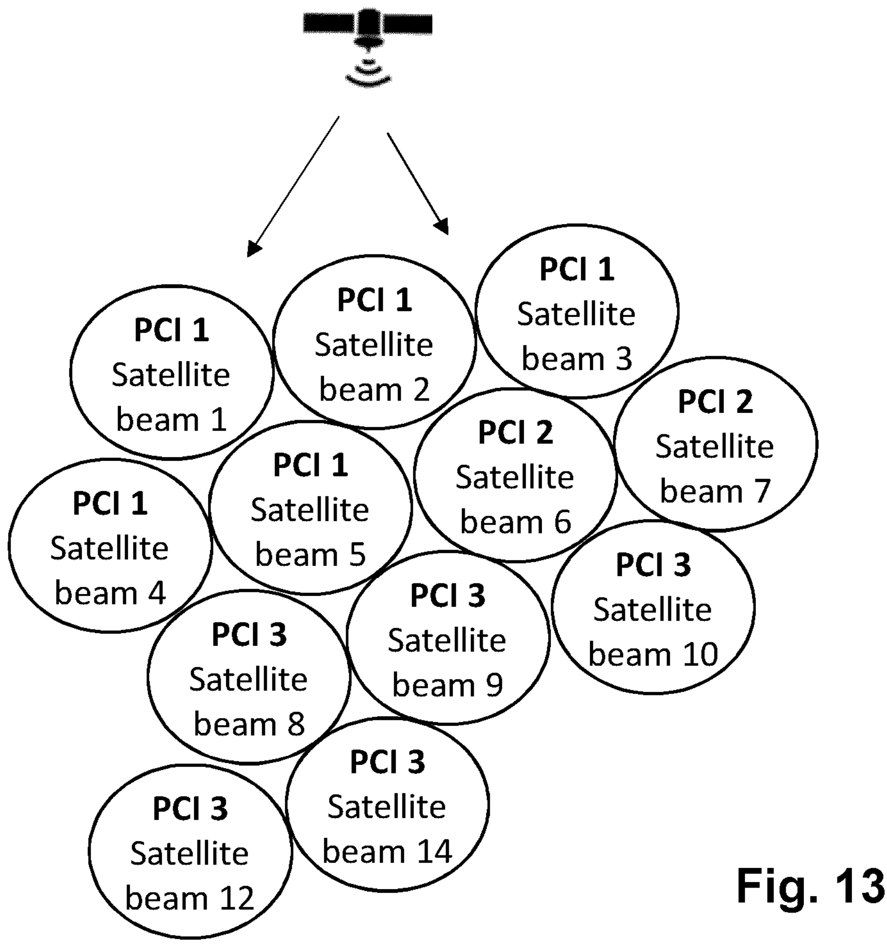
FIG. 13 illustrates a mapping of one cell (PCI) to multiple satellite beams.
Figure 14:
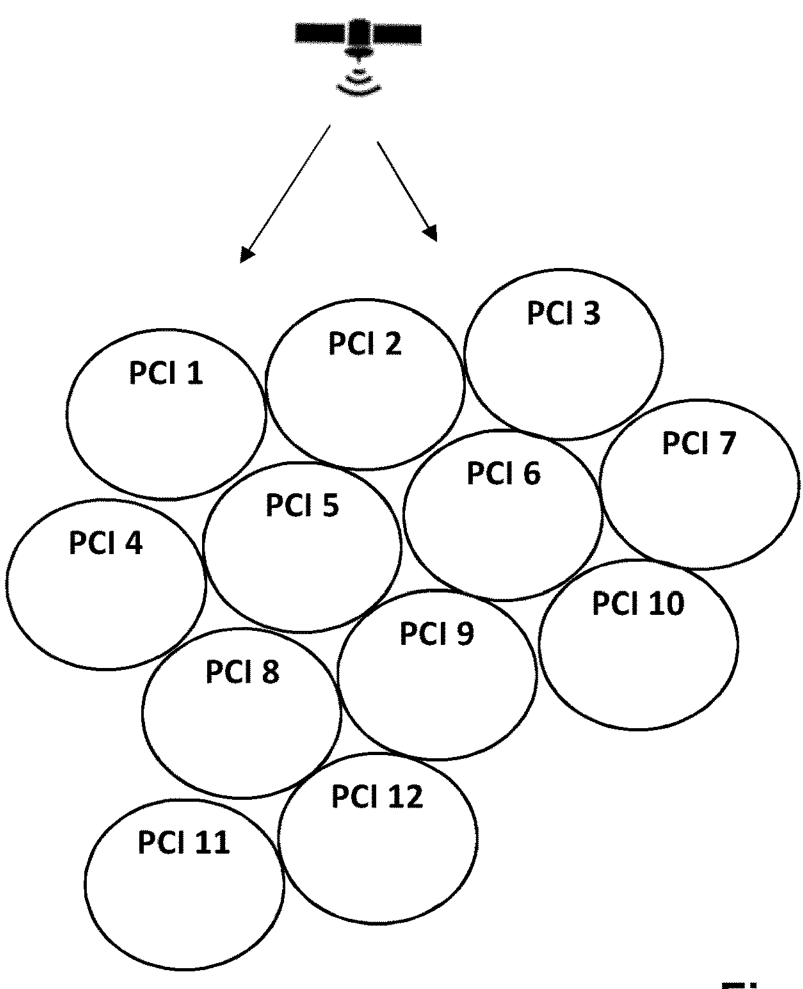
FIG. 14 illustrates a mapping of one cell (PCI) to a single satellite beam.

Regarding a mapping between satellite beam, NR cell, and NR SSB beam, different deployment options, e.g., options a and b shown in FIGS. 13 and 14, may be considered. In accordance with deployment option a illustrated in FIG. 13, one cell (corresponding to a PCI has multiple satellite beams (e.g., the same PCI for multiple satellite beams), whereas in accordance with deployment option b shown in FIG. 14, one cell corresponds to one satellite beam (there is one PCI per satellite beam).

A satellite beam can consist of one or more SSB beams. For instance, one satellite beam can be mapped to one SSB beam, e.g., there is a one-to one correspondence between satellite beams and SSB beams. Therein, the beam used to transmit the NR Synchronization Signal Block) is referred to as SSB beam. One NR cell (PCI) can have up to L SSB beams, where L can be 4, 8, or 64, depending on the band. The SSB beam can be used as a reference beam for beam management in NR.

Figure 15:
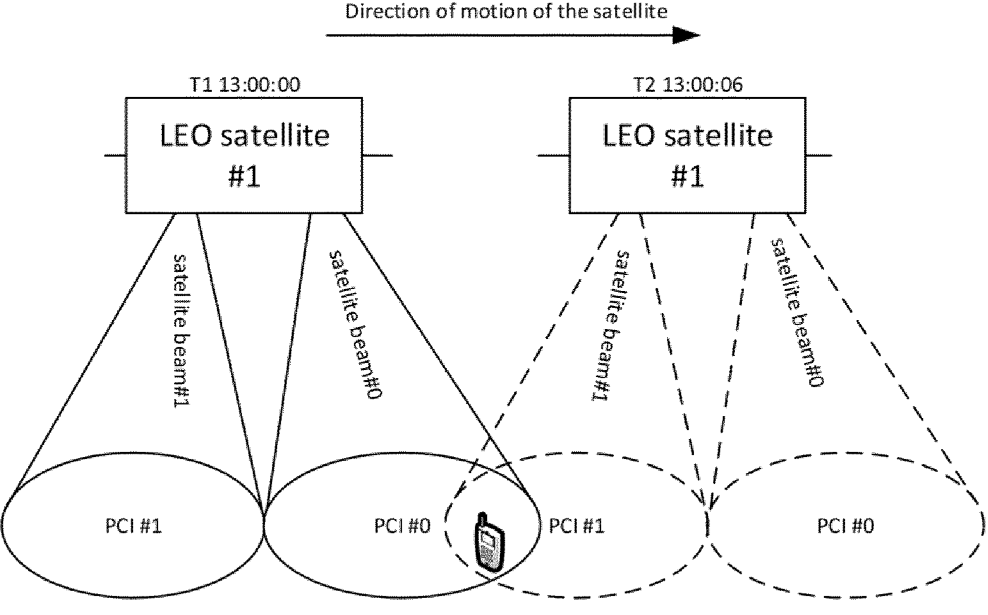
FIG. 15 illustrates an earth moving cell scenario in an NTN.

A NTN scenario that provides cells which are continuously moving on the Earth (e.g., a LEO, MEO, or HEO based NTN), is referred to as an earth moving cell scenario. An earth moving cell scenario is illustrated in FIG. 15. The continuous cell motion on the Earth is due to the operation where the satellite beam is fixed with respect to the NTN platform. Therefore, the footprint of the cell, which may correspond to several satellite beams or one satellite beam in accordance with above-described deployment options a and b, slides on the earth surface with the motion of the NTN platform (e.g., a LEO satellite as shown in FIG. 15).

Figure 16:
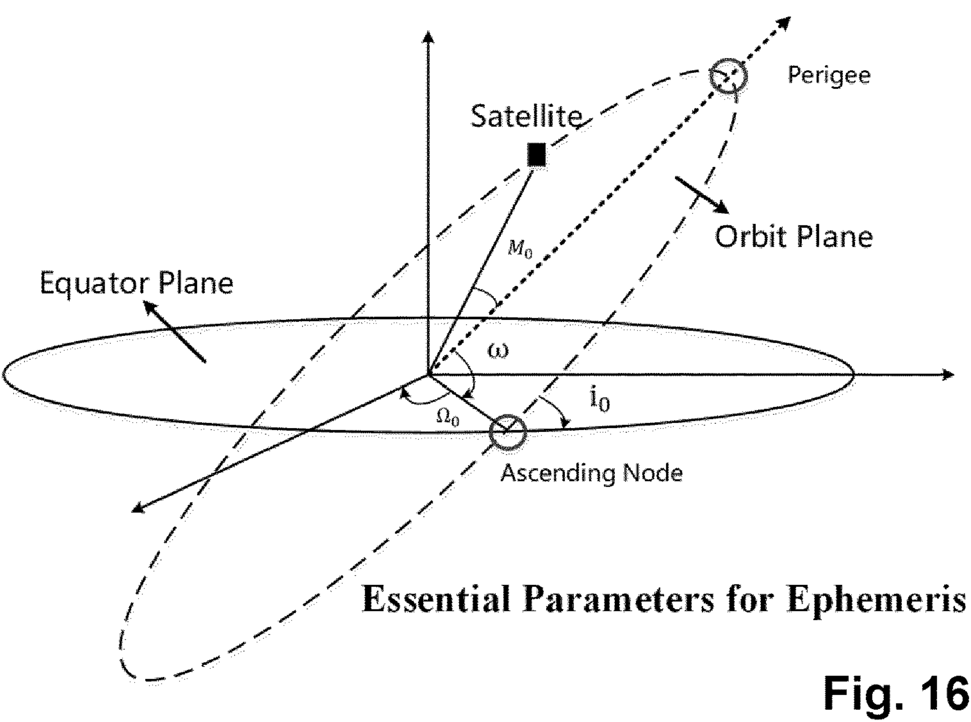
FIG. 16 illustrates parameters of ephemeris.

Information about the orbital trajectories of satellites are contained in ephemeris data (or "satellite ephemeris data"). There are different possible representations of ephemeris data, wherein one possibility is to use orbital parameters such as semi-major axis, eccentricity, inclination, right ascension of the ascending node, argument of periapsis, mean anomaly at a reference point in time, and the epoch. The first five parameters can determine an orbital plane (orbital plane parameters), and the other two parameters are used to determine exact satellite location at a time (satellite level parameters). Orbital plane parameters and satellite level parameters are listed in Table 2 and illustrated in FIG. 16 (see also section 7.3.6.1, Representation of Complete Ephemeris Data, of 3GPP TR 38.821 V16.0.0). Another possible option is to provide coordinates of the satellite location (x, y, z), a velocity vector (vx, vy, vz) and a reference point in time.

TABLE 2

| Elements of Ephemeris | | |
|---|---|---|
| Orbital plane parameters | $\sqrt{\alpha}$ | Square root of semi major axis a (semi-major axis) |
| | e | Eccentricity (eccentricity) |
| | $i_0$ | Inclination angle at reference time (inclination) |
| | $\Omega_0$ | Longitude of ascending node of orbit plane (right ascension of the ascending node) |
| | $\omega$ | Argument of perigee (argument of periapsis) |
| Satellite level parameters | $M_0$ | Mean anomaly at reference time (true anomaly and a reference point in time) |
| | $t_{0e}$ | Ephemeris reference time (the epoch) |

Accordingly, a representation of ephemeris data may need seven parameters (e.g., double-precision floating point numbers) and possibly some overhead. In an NTN system, several satellites may share a common orbital plane. In such cases, some ephemeris data may be provided for orbital planes rather than for single satellites, to reduce the amount of data. The ephemeris data per orbital plane may be stored in the UE or in the UE's Subscriber identity Module (SIM).

However, for networks with many satellites, the size of ephemeris data can be rather large. Accordingly, rather than storing the ephemeris data, the ephemeris data may at least partially be transmitted from a gNB.

For instance, satellite level orbital parameters for all satellites that may serve a UE may be stored in the UE or in the SIM, and the ephemeris data for each satellite is linked to a satellite ID or index. The satellite ID or index of the serving satellite may then be broadcast in system information so that the UE can find the corresponding ephemeris data in the UE's SIM or storage.

Alternatively, satellite level orbital parameters of the serving satellite may be broadcast in system information and UE will derive the position coordinates of the serving satellite. The ephemeris data of the neighboring satellites can also be provided to UE via system information or dedicated RRC signaling. In case the baseline orbital plane parameters are provisioned in the UE or SIM, it may be sufficient to broadcast the mean anomaly at a reference point in time and the epoch need to be broadcast to UE, so that overhead can be reduced.

As described above with reference to FIG. 15, an earth moving cell scenario is a NTN scenario that provides cells continuously moving on the Earth. This is due to the operation where the satellite beam is fixed with respect to the NTN platform. Therefore, the footprint of the satellite beam slides on the Earth surface with the motion of the NTN platform (e.g., a LEO satellite).

As also mentioned above, there is an association between cells and tracking areas. However, if, in an earth moving cell scenario, the TAC broadcast by a cell does not change, this means that the TA sweeps over the ground as cells move. With such a moving hacking area, even a stationary UE has to keep performing frequent registration update, which causes additional overhead and power consumption.

For these reasons, instead of a moving tracking area, a fixed tracking area may be considered for NTN. Accordingly, a tracking area corresponds to a fixed geographical location on earth. For moving cells, the fixed TA can be realized by the following two approaches: According to one approach, the TAC broadcast by a (moving) cell changes as the cell covers different geographical areas. According to another approach, the TAC is not broadcast, and the UE derives on the Registration Area from other ways, e.g., from its location information.

Regarding the mapping between cells and tracking areas, the options of "hard switch" and "soft switch" may be considered. Hard switch means that one cell broadcasts only one TAC per PLMN. When a new TAC of a cell replaces the old TAC, there may be some fluctuation at the border area between TAs. On the other hand, in the "soft switch" option, one cell can broadcast more than one TACs per PLMN. The cell adds a new TAC in its system information in addition to the old one and removes the old one a bit later. However, the signaling of more TACs may cause increased overhead (for hard switch and soft switch, see also 3GPP TR 38.821, V16.0.0 (2019-12), Technical Specification Group Radio Access Network; Solutions for NR to support non-terrestrial networks (NTN), Section 7.3.1.3.1).

In the following, some details regarding location based TA determination are described. In particular, it may be considered to derive the Earth into a plurality of geographical areas corresponding to TAs. A mapping rule between a geographical area and its associated TAC value may further be kept both in the UE and in the network.

For instance, during initial registration, the UE derives the TAC based on its location information and the mapping rule, and then forms the TAI from the derived TAI and the broadcast PLMN ID. Then, the UE reports the TAI to the AMF via REGISTRATION REQUEST message. The AMF then provides a TAI list including the reported TAI to the UE via REGISTRATION ACCEPT message.

When the UE moves to a new geographical area, the UE derives the TAC based on its location information and the mapping rule, and then forms the TAI from the TAC and the broadcast PLMN ID. If the formed TAI is not in the TAI list, mobility registration update procedure will be triggered. Therein, the UE reports the TAI to the AMF via REGIS- TRATION REQUEST message. The AMF provides a TAI list including the reported TAI to UE via REGISTRATION ACCEPT message. The UE then replaces the old TAI list with the new one including the reported TAI (see also 3GPP TR 38,821, V16.0.0 (2019-12), Technical Specification Group Radio Access Network; Solutions for NR to support non-terrestrial networks (NTN), Section 7.3.1.3.2).

Regarding the above described mechanism of TA determination, it is in general unclear how a mapping rule between geographical areas and TACs is made available at the UE. Further, as a particular example, if cell selection or reselection is based on radio signal strength, but the TAC is not broadcast, it is unclear how the UE determines that it is still in the RA, e.g., if a positioning function is not available.

Furthermore, because of the moving cell, there is no fixed relationship between call and Registration Area. When the core network needs to page a UE, it is unclear what information is needed and how such information is obtained in order for the AMF to select gNB(s) to deliver the paging message and for the gNB to select cell(s) to page the UE.

The present disclosure is directed to tracking area determination and paging handling for non-terrestrial networks.

In this disclosure, UEs and scheduling nodes such as base stations and corresponding methods are described for the new radio access technology envisioned for the 5G mobile communication systems such as 3GPP NR, but which may also be used in LTE mobile communication systems.

Accordingly, a communication apparatus (or user terminal or communication terminal) is referred to as UE (user equipment), and a scheduling node such as a base station may correspond to a gNodeB (gNB).

Moreover, some of the terms of the procedures, entities, layers, etc., used in the following are closely related to LTE/LTE-A systems or to terminology used in the current 3GPP 5G standardization, even though specific terminology to be used in the context of the new radio (NR) access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology.

A communication apparatus or device, such as a UE, and a scheduling node or base station may comprise a transceiver and circuitry such as processing circuitry. The transceiver in turn may comprise and/or function as a receiver and a transmitter. The processing circuitry may be one or more pieces of hardware such as one or more processors or any LSIs (Large Scale integration). Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

Communication apparatuses, such as UE and base station, as well as core network entities such as an AMF system, may comprise circuitry, which may include processing circuitry as well as control circuitry.

Figures 17, 18:
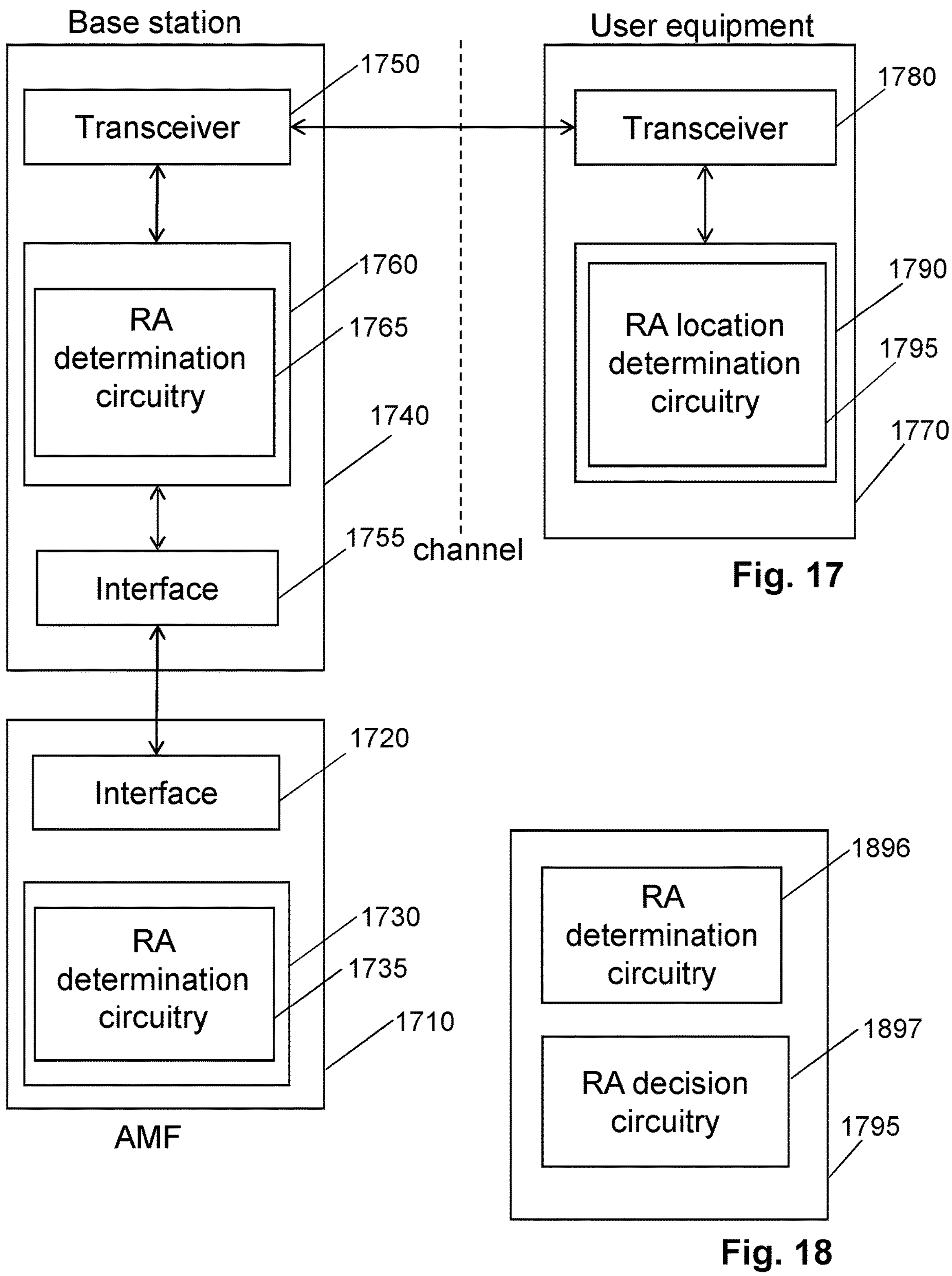
FIG. 17 is a block diagram showing an AMF system, a base station, and a user equipment (UE)
FIG. 18 is a block diagram illustrating RA location determination circuitry of a user equipment.

Provided is a user equipment, UE 1770. As shown in FIG. 17, the UE comprises a transceiver 1780, which, in operation, transmits a registration request. The registration request (or "registration request message") includes at least one of:

an indication of a first location of the UE, or a cell ID of a last cell that has been visited by the UE and a timestamp indicating a first time instant at which the UE has been located within the last cell.

The transceiver 1780 of the UE 1770 (or "UE transceiver") receives a registration accept message including an indication of a registration area (RA), wherein the registration area includes the first location of the UE.

The UE 1770 further comprises circuitry 1790 (or "UE circuitry"), which, in operation, determines whether or not the UE is located in the registration area at a second location. The determination as to whether or not the UE is in the registration area is made based on at least one of:

A list of cell IDs of a plurality of earth moving cells or cell sections of the earth moving cells, an indication of a second time instant when the plurality of earth moving cells form the registration area, coverage area information indicating, for each of the plurality of earth moving cells, a coverage area of the cell or cell section relative to a satellite location of a satellite generating the cell and ephemeris data of the satellite, and a measurement of the second location of the UE. The list of the plurality of earth moving cells and the indication of the second time instant are included in the indication of the registration area, or The list of cell IDs, an indication of a time interval when the plurality of earth moving cells or cell sections form the registration area, and a cell ID of a newly visited cell or cell section including the second location of the UE and different from the last cell. The list of cell IDs and the indication of the time interval are included in the indication of the registration area, or the measurement of the second location and a mapping between geographical areas and tracking areas and a list of one or more tracking areas forming the registration area, wherein the mapping is read from a storage, and the list of one or more tracking areas is included in the indication of the registration area.

The user equipment 1770 is a mobile apparatus, communication apparatus, or mobile terminal of a wireless communication system.

For instance, the UE circuitry 1790 may comprise RA location determination circuitry 1795. Exemplary RA location determination circuitry 1795 is shown in FIG. 18, comprising RA determination circuitry 1896 and RA decision circuitry 1897.

Further provided, and also shown in FIG. 17, is a base station 1740. The base station 1740 comprises an interface 1755 (also "base station interface") which, in operation receives a paging request to page a UE. The paging request includes an indication of a registration area. The base station further comprises circuitry 1760 ("base station circuitry") which, in operation, determines, based on:

a list of cell IDs of a first plurality of earth moving cells or cell sections of the earth moving cells, an indication of a time instant when the first plurality of earth moving cells form the registration area, and coverage area information indicating, for each of the first plurality of earth moving cells, a coverage area of the cell or cell section relative to a satellite location of a satellite generating the cell and ephemeris data of the satellite, wherein the list of the first plurality of earth moving cells and the indication of the time instant are included in the indication of the registration area, or the list of cell IDs and an indication of a time interval when the first plurality of earth moving cells or cell sections form the registration area, wherein the list of cell IDs and the indication of the time interval are included in the indication of the registration area, or a mapping between geographical areas and tracking areas and a list of one or more tracking areas forming the registration area, wherein the mapping is read from a storage and the list of one or more tracking areas is included in the indication of the registration area, a second plurality of earth moving cells. The second plurality of earth moving cells is a plurality of cells currently mapped to the registration area. The base station 1740 further comprises a transceiver 1750 which, in operation, transmits a paging message for paging the UE in the second plurality of cells.

For instance, base station circuitry 1760 comprises RA determination circuitry 1765.

The base station 1740 is a scheduling node or scheduling apparatus of a wireless communication system, such as a gNB of 3GPP NR, where a non-terrestrial network is implemented. Accordingly, earth moving cells are served by satellites (e.g., LEO) or other non-terrestrial platforms such as airships or air balloons, e.g., the communication system is an NR-NTN communication system. The communication system may comprise the earth moving cells either alone or in combination with or supplementing stationary cells generated, for example, by terrestrial base stations. UE 1770 and base station 1740 communicate over a wireless channel. The present disclosure is not limited to a particular relationship between the base station and the satellite, both regenerative satellite and transparent satellites shown in FIGS. 11 and 12, or communication systems implementing both regenerative and transparent satellites are possible.

Further, the base station communicates with a core network entity or system, such as AMF, via interface 1755.

In the above description of the base station, the "first plurality of cells" refers to earth moving cells which define the registration area in connection with information on the time (a time instant or time interval) when the first plurality of cells constitute the registration area. On the other hand, the "second plurality of cells" are cells in which the UE is to be paged. As will be described further, the second plurality of cells is determined based on the first plurality of cells.

The base station may serve one cell or a greater number of cells. Moreover, the registration area may be greater than the number of cells served by the base station 1740. Thus, the "second plurality of cells," which is determined by the base station for paging the UE, may cover the entire registration area or a subarea of the registration area.

As is also shown in FIG. 17, disclosed is an AMF (Access mobility and management) system 1710. The AMF system 1710 comprises an interface 1720 ("AMF interface") and circuitry 1730 (AMF circuitry). The AMF interface 1720, in operation, receives a registration request of a UE, which includes an indication of a first location of the UE, or a cell ID of a last cell that has been visited by the UE and a timestamp indicating a first time instant at which the UE has been located within the last cell.

The AMF circuitry 1730 determines, generates an indication of a registration area including the first location of the UE. The indication of the registration area includes:

a list of cell IDs of a plurality of earth moving cells or cell sections of the earth moving cells, an indication of a second time instant when the plurality of earth moving cells form the registration area (wherein the registration area is determined based on coverage area information indicating, for each of a plurality of earth moving cells or cell sections, a coverage area of the cell or cell section relative to a satellite location of a satellite generating the cell and ephemeris data of the satellite), or the list of cell IDs and an indication of a time interval when the plurality of earth moving cells or cell sections form the registration area, or a list of one or more tracking areas forming the registration area, wherein the list of one or more tracking areas is determined based on a mapping between geographical areas and tracking areas, the mapping being read from a storage.

The AMF interface 1720, in operation, transmits a registration accept message including an indication of the registration area.

The AMF system 1710 is an AMF entity of a core network such as a 5th Generation Core. For instance AMF system may be implemented as a server, within a server hosting further core network entities, or distributed among a plurality of nodes.

AMF system 1710 and base station 1740 perform communication via interfaces 1720 and 1755. For instance, interfaces 1720 and 1755 form the NG interface. AMF system 1710 and base station 1740 may perform communication via interfaces 1720 and 1755 over a wired connection (which may include a fiber optic cable) or a wireless connection (e.g., in the scenario of regenerative satellite). Base station interface 1755 may be included in the base station transceiver 1750 or distinct from the base station transceiver 1750.

For instance, as shown in FIG. 17, the AMF circuitry 1730 includes RA determination circuitry 1735.

As described above, the UE 1770 and AMF 1710 exchange a registration request message and a registration accept message. This exchange may be performed via base station 1740, which may forward these control messages of the registration procedure. Therein, the base station transceiver 1750, in operation, may receive the registration request message from the UE and transmit the registration accept message to the UE. Likewise, the base station interface 1755 may transmit the registration request message to the AMF and receive the registration accept message from the AMF.

In correspondence to the above described user equipment, provided is a communication method for a user equipment, UE. As shown in FIG. 19. The method includes the step S1910 of transmitting a registration request including at least one of:

an indication of a first location of the UE, or a cell ID of a last cell that has been visited by the UE and a timestamp indicating a first time instant at which the UE has been located within the last cell.

The method includes step S1920 of receiving a registration accept message including an indication of the registration area, wherein the registration area includes the first location of the UE. Moreover, the method includes a step S1930 of determining, based on

- a list of cell IDs of a plurality of earth moving cells or cell sections of the earth moving cells, an indication of a second time instant when the plurality of earth moving cells form the registration area, coverage area information indicating, for each of the plurality of earth moving cells, a coverage area of the cell or cell section relative to a satellite location of a satellite generating the cell and ephemeris data of the satellite, and a measurement of a second location of the UE, wherein the list of the plurality of earth moving cells and the indication of the second time instant are included in the indication of the registration area, or
- the list of cell IDs, an indication of a time interval when the plurality of earth moving cells or cell sections form the registration area, and a cell ID of a newly visited cell or cell section including the second location of the UE and different from the last cell, wherein the list of cell IDs and the indication of the time interval are included in the indication of the registration area, or
- the measurement of the second location and a mapping between geographical areas and tracking areas and a list of one or more tracking areas forming the registration area, wherein the mapping is read from a storage, and the list of one or more tracking areas is included in the indication of the registration area,
- whether or not the UE is located in the registration area at the second location.

In correspondence with the above-described base station, further disclosed is a communication method for a base station. The method, which is illustrated in FIG. 20, includes a step S2010 of receiving a paging request to page a user equipment. UE, including an indication of a registration area. The method further includes step S2020 of determining, based on:

- a list of cell IDs of a first plurality of earth moving cells or cell sections of the earth moving cells, an indication of a time instant when the first plurality of earth moving cells form the registration area, and coverage area information indicating, for each of the first plurality of earth moving cells, a coverage area of the cell or cell section relative to a satellite location of a satellite generating the cell and ephemeris data of the satellite, wherein the list of the first plurality of earth moving cells and the indication of the time instant are included in the indication of the registration area, or
- the list of cell IDs and an indication of a time interval when the first plurality of earth moving cells or cell sections form the registration area, wherein the list of cell IDs and the indication of the time interval are included in the indication of the registration area, or
- a mapping between geographical areas and tracking areas and a list of one or more tracking areas forming the registration area, wherein the mapping is read from a storage and the list of one or more tracking areas is included in the indication of the registration area,
- a second plurality of earth moving cells currently mapped to the registration area.

The method further includes step S2030 of transmitting a paging message for paging the UE in the second plurality of cells.

Moreover, in correspondence with the above-disclosed AMF system, provided is a communication method for an AMF system. As shown in FIG. 21. The method for the AMF system includes step S2110 of receiving a registration request of a user equipment, UE, including:

- an indication of a first location of the UE, or
- a cell ID of a last cell that has been visited by the UE and a timestamp indicating a first time instant at which the UE has been located within the last cell.

The method for the AMF system includes generating an indication of a registration area including the first location of the UE. The indication of the registration area includes:

- a list of cell IDs of a plurality of earth moving cells or cell sections of the earth moving cells, an indication of a second time instant when the plurality of earth moving cells form the registration area, wherein the registration area is determined based on coverage area information indicating, for each of a plurality of earth moving cells or cell sections, a coverage area of the cell or cell section relative to a satellite location of a satellite generating the cell and ephemeris data of the satellite, or
- the list of cell IDs and an indication of a time interval when the plurality of earth moving cells or cell sections form the registration area, or
- a list of one or more tracking areas forming the registration area, wherein the list of one or more tracking areas is determined based on a mapping between geographical areas and tracking areas, the mapping being read from a storage.

Further, the method for the AMF includes transmitting a registration accept message including the indication of the registration area.

In this disclosure, any explanations and examples shall be interpreted as being applicable to each of UE, base station, and AMF system, and shall apply to both apparatuses and methods, unless the context indicates otherwise.

Stored Mapping of TAG and Geographical Area

In some embodiments, a mapping between TAC and geographical area is pre-defined as a fixed relationship and installed to UE on a memory. The memory may be a memory device, a SIM (subscriber identity module), built in memory, or other memory device. UE determines its location, e.g., using GNSS (global navigation satellite system), derives a TAI based on its location information, and transmits the derived TAI as an indication of its location to the AMF. The UE then receives, in the registration accept message from the AMF, a list of one or more tracking areas (which may be indicated by TACs) as an indication of the registration area. When the UE, at some location (the "second location"), needs to determine whether it is still in the registration area (e.g., for a periodic update or when camping on or visiting a new cell), the UE circuitry 1790 reads a mapping between tracking areas or TACs and geographical areas from the storage. Accordingly, the UE may further include a storage interface that reads the mapping from the storage. The UE determines, based on the second location (in particular a TAC formed based on the second location and thereby indicating the second location), the received list of TAC(s), and the stored mapping, whether or not the UE is in the registration area composed of the TAC(s) in the list.

For example, in the mapping between TACs and geographical areas, one country may be assigned with one TAC (e.g., TAC 1=Germany, TAC 2=Austria, TAC 3=Switzerland, etc.). For countries with larger areas, multiple TACs can be defined, which may be assigned with provinces, federal states, etc. The borders of geographical area may be stored in the UE or storage device such as SIM, or derivable from map information, such as a digital map stored in the UE or storage device. Accordingly, the UE is capable, based on a position measurement, of knowing in which area it is located.

The embodiments using a stored mapping between TACs and geographical areas provide backward compatibility in that the registration area can be signaled to the UE as in legacy, using TAC or TACs. However, with the mapping being stored on the UE or storage device such as SIM, the TA definition (the mapping from one TAC to a certain region) may be difficult to update).

Cell Coverage Areas at Time Instant

In some embodiments, the registration area (or tracking area) is defined by a union of the (earth moving) cell coverage area at a certain time instant.

Figure 22:
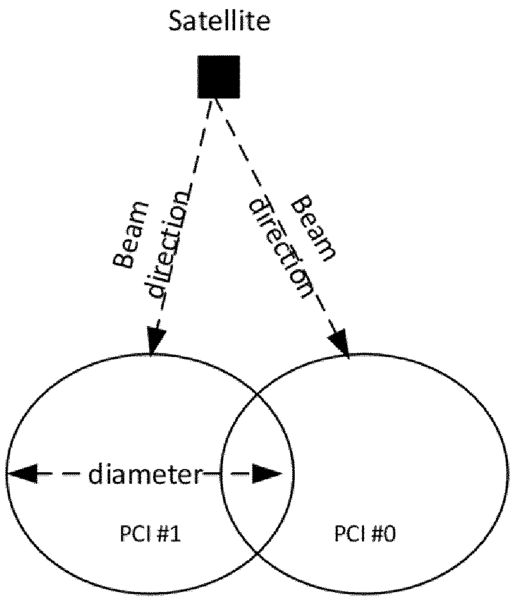
FIG. 22 illustrates an indication of a cell coverage area h satellite beam direction and diameter.
Figure 23:
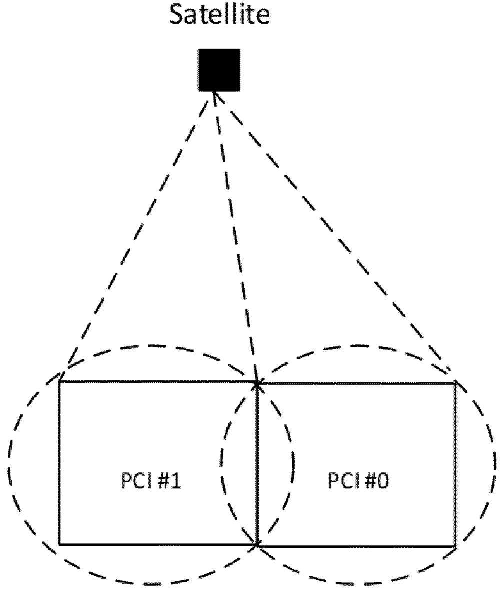
FIG. 23 illustrates an indication of a cell coverage area by non-overlapping shapes.
Figure 24:
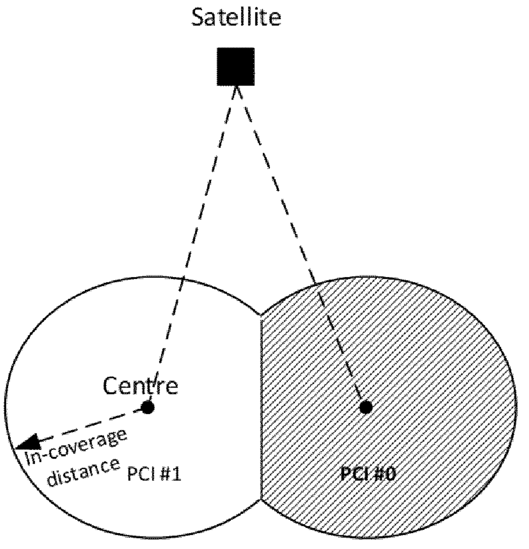
FIG. 24 illustrates an indication of a cell coverage area by cell center and in-coverage distance.

Therein, the cell coverage area may be defined by one of the following information, which may be included in the coverage area information and thus made available to the UE for each of a plurality of earth moving cells, and which is illustrated in FIGS. 22 to 24:

In a first example, as shown in FIG. 22, the cell area is defined by a satellite beam direction of each beam forming the cell (a cell may consist of one beam or comprise a plurality of beams as described with reference to FIGS. 13 and 14), and a beam radius or diameter on earth, such as a radius or diameter of the cell or of the beam footprint on earth. In this case, the cells may be overlapping.

In a second example, as shown FIG. 23, the cell area of an earth moving cell is defined by a polygon defining the coverage area in a non-overlapping manner. For instance, the cell area is defined by vertexes of non-overlapping shapes such as rectangle or hexagon.

For example, the polygon may be indicated using a reference point (such as a corner or a center), which may be a position relative to the current satellite position available from ephemeris data plus a side length of the polygon or different indication of the polygon size. As another example, the polygon may be indicated using coordinates of all corners of the polygon relative to the satellite position.

In a third example shown 24, a cell may be defined be a cell center and an in-coverage distance (e.g., in-coverage radius) from the center. In this example, the signaling may be similar to the first example.

The above definitions of the coverage area information in accordance with the first to third options can be provided with respect to the position of the satellite position, e.g., relative to the satellite location of the satellite (or satellites) generating the satellite beam(s), which changes with time and which is derivable for a given point in time from the ephemeris data. With the movement of the satellite over time, the coverage area, e.g., its size, may also change in time. For instance, the size of the satellite beam area may be adjusted to the UE density or population density of the area covered by the satellite beam. Accordingly, when the satellite is moving over an earth area with a higher population density, the coverage area such as beam footprint or ground cell/beam area may shrink to provide smaller cells and thereby cope with the increased demand caused by a higher number of UEs that need to be served.

Figure 25:
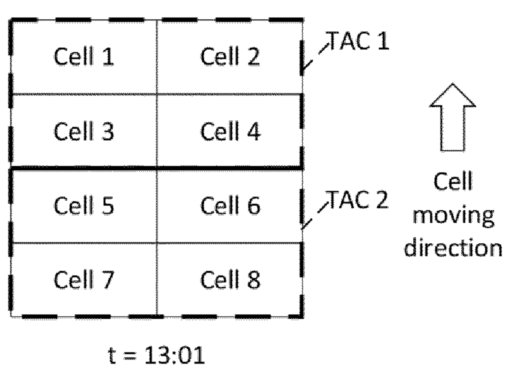
FIG. 25 illustrates a definition of tracking areas as a union of cell areas at a certain time instant.
Figure 25:
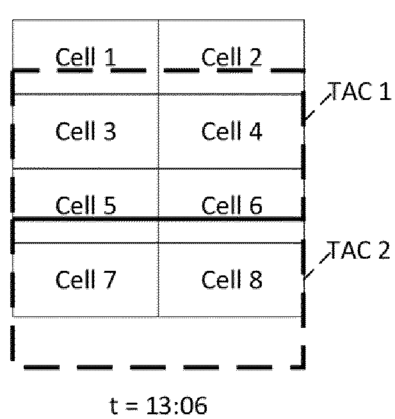

A tracking area or registration area is defined by a union of cell areas in connection with a time stamp, as shown in FIG. 25 (e.g., TA 1={cell 1, cell 2, cell 3, cell 4 at t=13:01}, and TA 2={Cell 5, Cell 6, Cell 7, Cell 8, at t=13:01}).

If a definition of the cell coverage areas of the moving cells in accordance with the above examples from FIGS. 22 to 24 in connection with a given timestamp, the user equipment may use the cell coverage area information, the time stamp, and satellite ephemeris data to calculate the area on earth covered by these cells at the indicated time instant. The registration area and/or the tracking area can then be determined as the area covered by a plurality of cells at the certain time instant. Thus, the tracking area and/or registration area can be considered to be defined by "frozen cells" that covered the registration area or will cover the registration area at the indicated time instant.

For instance, the UE receives the coverage area information within system information. For instance, the cell coverage area is signaled from gNB to UE via broadcast RRC signaling, e.g., SIB. In addition to the coverage area of the cell, the UE may further receive in the system information the satellite ephemeris data or part of the ephemeris data, which the UE may then use to calculate the satellite movement with respect to the earth surface (possibly using further parts of the ephemeris data which may be pre-stored in a storage device).

The registration area is signaled from AMF to UE via NAS signaling, e.g., a registration accept message or configuration update command message shown in FIGS. 6 and 7. Therein, it is sufficient to signal to the UE only the TAs that the UE is registered to. These TAs can in particular be signaled by signaling the "frozen cells," i.e., a list of cell IDs and the timestamp of the time instant at which the cells from the list form the registration area, Registration Area={cell 1, cell 2, cell 3, cell 4, cell 5, cell 6, cell 7 cell 8, at t=13:01} corresponding to TAC 1 and TAC 2 in FIG. 25. These cell IDs can be signaled instead of TA codes, which are not needed at the UE to determine the registration area. Nevertheless, the concept of tracking areas may still be used at the side of the AMF or base station. For instance, the AMF may comprising a plurality of cells to form a registration area assigned to a UE.

Accordingly, the UE knows the mapping between Registration Area and geographical location. Based thereon, the UE is able to determine from its location information such as a GNSS position measurement whether it moves out of the Registration Area or not.

For instance, to determine whether the UE is still within the registration area, the UE may test, for each of the cell coverage areas of the "frozen cells" that constituted the registration area at a given time instant, whether the UE is in the respective cell coverage area, e.g., by comparing a distance of the UE to the cell center with a cell radius. Once the UE identifies a coverage area of a frozen cell where the distance to the center is smaller than the radius, the UE knows that it is within the registration area, and may stop calculating. Alternatively, based on the plurality of the cell coverage areas, the UE may calculate the extent or limits of the registration area, and may determine for the registration area as a whole whether the UE is located within these limits.

The cell coverage area information may further be pre-configured in both the AMF system and the gNB during the cell planning phase, or alternatively be signaled from gNB to AMF via NGAP signaling, e.g., NG Setup Request message, or RAN Configuration Update message (see FIGS. 8 and 9). Furthermore, the mapping between cell and gNB may be pre-configured at the AMF. The UE reports the cell ID of its last visited cell with a time stamp, or alternatively an indication of the UE location, to the AMF via Registration Request message.

Accordingly, the AMF knows which gNB(s) cover the Registration Area at any time instance, and is able to determine which gNB or gNB(s) are to deliver the paging message.

Furthermore, the definition of the Tracking Area and of the Registration Area in terms of cell IDs and a timestamp corresponding to "frozen cells" is signaled from AMF to gNB, e.g., in a paging message. Accordingly, the gNB knows which cell(s) cover the registration area, and is able to determine in which cells the paging is to be broadcast.

Figure 26:
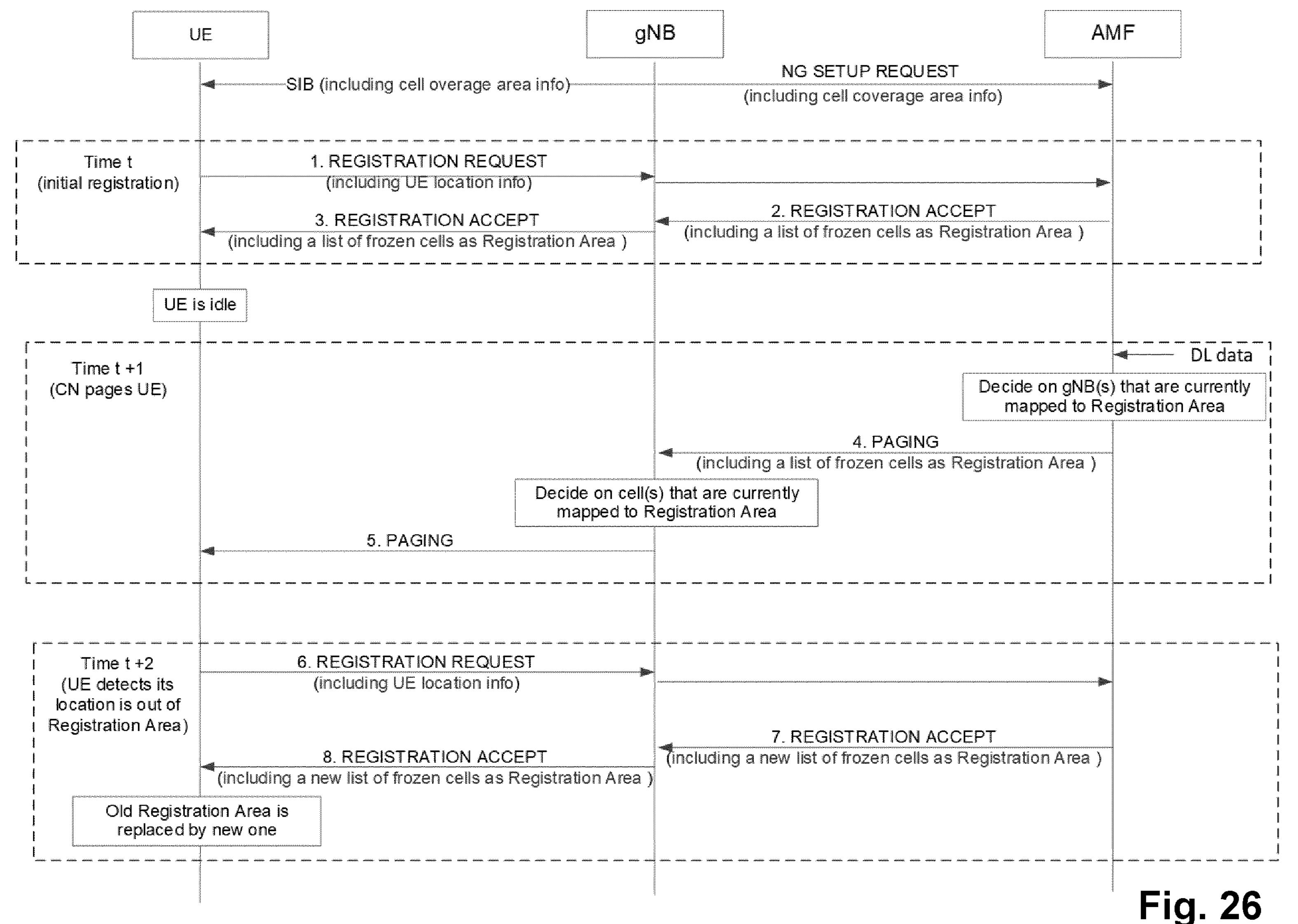
FIG. 26 illustrates registration and paging call flows.

A possible example of registration and paging call flows is shown in FIG. 26. As shown, the gNB transmits a SIB to the UE, which includes cell coverage information including an indication of the cell coverage area relative to the satellite position. The SIB may further include an indication of satellite ephemeris data unless the ephemeris data is complete stored at the UE side. Further, the gNB may transmit the cell coverage area info to the AMF included in an NG Setup Request Message (e.g., if the cell coverage information is not pre-configured in the AMF as well).

At a time t of initial registration, the UE transmits to the AMF a Registration Request message including a UE location info or a cell ID of the last visited cell with a timestamp. In response, the AMF transmits to the UE a Registration accept message including, as an indication of the registration area, a list of cell IDs and a timestamp of the time instant at which the cells indicated by the list form the registration area. As shown in FIG. 26, the registration request and the registration accept may be forwarded by the gNB.

At a time t+1, the AMF receives downlink data for the UE while the UE is in an idle state. The AMF system then decides gNB(s) that are currently mapped to the registration area and which serve the cells that are currently mapped to the registration area. To these gNBs, the AMF system transmits a paging message (or paging request message) including a list of cells and a timestamp at which these cells form the registration area. Using the list, the timestamp, and ephemeris data held at the gNB, the gNB determines which of the cells it serves are currently included in the registration area, and performs paging of the UE over these cells included in the registration area.

When the UE is in RRC idle mode, paging is initiated by the AMF. Accordingly, the AMF transmits the paging message to the base station(s), and the base stations broadcast the paging message in the cells of the registration area to page the UE. In this disclosure, the term "paging request" or "paging request message" is used for a message from AMF to base station, which includes the an indication of the registration area, and which may include the paging message for paging the UE.

At a time t+2, the UE may detect, based on a location measurement, that its location is out of the registration area. The UE then transmits a new registration request including its current location, and receives, in a registration accept message, a new list, of cell IDs plus timestamp at which these cells form the UE's new registration area. The UE then replaces the previous registration area with the new one.

If cell coverage area info in the SIB together with the ephemeris data, this data may further facilitate for the UE to perform cell selection without measuring the radio signal strength since measuring of the radio signal strength could otherwise occur frequently due to the movement of the cells. Accordingly, the cell coverage area info can be used by the UE for cell selection and reselection as well as for determining whether or not the UE is in the registration area.

Furthermore if the cell coverage area is already available via SIB, only a limited amount of signaling overhead (cell IDs plus timestamp) is required to indicate the registration area based on the cell coverage area information.

Cells with Respective Timing

In some embodiments, the Registration Area or Tracking Area is defined by listing all cells with a respective associated timing (or time interval) when the cells will cover a given geographical location or area on Earth. The UE is provided with a list of cell IDs of earth moving cells and an indication of a time interval when the earth moving cells form the registration area as an indication of the registration area.

Moreover, the indication of the registration area, which is included in the registration accept message from the AMF; may include a plurality of lists of cell IDs of earth moving cells (or cell sections), and a plurality of indications of time intervals respectively indicating, for each list of the plurality of lists of cell IDs, when the earth moving cells (or cell sections) respectively indicated by the list of cell IDs, form the registration area.

Accordingly, by informing the UE of the cells that are in the registration area for a plurality of time intervals, signaling of the registration area is not required each time the cells that constitute the registration area change.

Figures 27, 29:
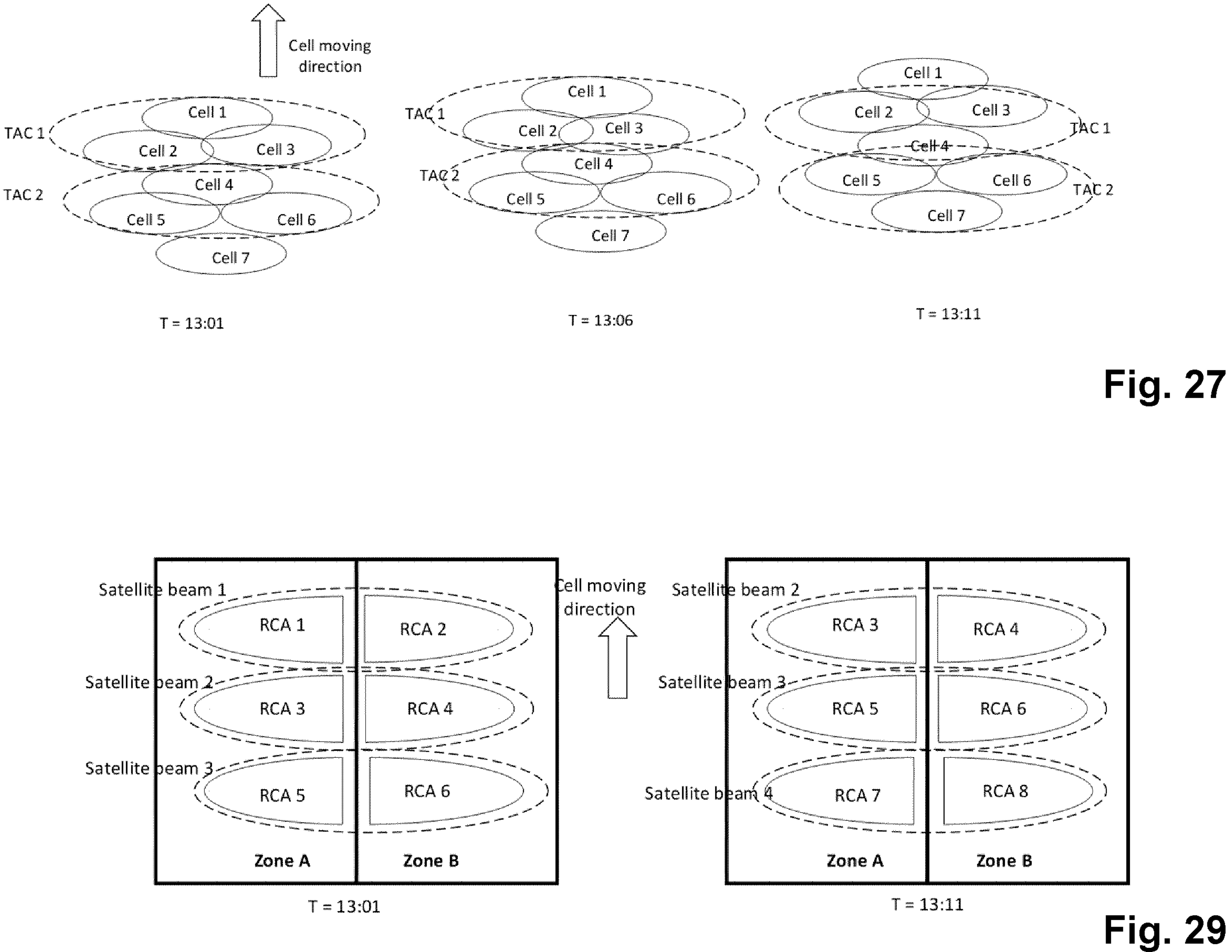
FIG. 27 illustrates an indication of tracking areas by lists of cells with associated time intervals.
FIG. 29 illustrates a definition of a registration area by restricted cell areas.

An example is shown in FIG. 27, where two tracking areas, TA 1 and TA2, change within two time intervals, 13:01-13:10 and 13:11-13:20 as follows (like the example of FIG. 25, this example is only illustrative, and the present disclosure is not limited to any particular length of the time interval or number of cell IDs in the registration area or tracking area):

- TA 1 = {13:01 - 13:10 cell 1, cell 2, cell 3;
  13:11 - 13:20 cell 2, cell 3, cell 4;
  ... }
- TA 2 = {13:01 - 13:10 cell 4, cell 5, cell 6;
  13:11 - 13:20 cell 5, cell 6, cell 7;
  ... }

As can be seen in FIG. 27, the set of cells included in a TA remains the same for a time period or time interval (in the above example, 10 minutes). Therefore, and since the cells are constantly moving, the resulting TAs (and accordingly, registration areas).

In the embodiments where such list or lists of cell IDs and corresponding time intervals are signaled to the UE as an indication of the registration area, tracking area codes are not needed at the UE side. Nevertheless, tracking areas may be used at the AMF side to determine the registration area to be assigned to a UE. The present disclosure is not limited to a particular way of how the tracking areas are determined on the AMF side.

For instance, considering the example from FIG. 27, a UE may be assigned a Registration Area {TA 1; TA 2}.

Accordingly, the UE may be indicated the registration area for two subsequent time intervals as follows:

RA = { 13:01 - 13:10 cell 1, cell 2, cell 3, cell 4, cell 5, cell 6;
13:11 - 13:20 cell 2, cell 3, cell 4, cell 5, cell 6, cell 7}.

To the UE, the Registration Area is signaled from the AMF in terms of multiple sets of cells (corresponding to a plurality of lists of cell IDs) with associated timing (e.g., the respective time interval when one of the sets of cells forms the registration area), via NAS signaling, e.g., REGISTRATION ACCEPT message or CONFIGURATION UPDATE COMMAND message.

There is no need to inform the UE of a coverage area of each cell. Legacy cell (re)selection based on radio signal strength can be reused. As a result, when the UE performs legacy cell (re)selection based on radio signal strength, the UE is able to determine from a cell ID of a newly visited or camped cell and a timing of visiting the cell whether the UE moves out of the Registration Area, without determining its location.

Moreover, cell coverage area information may be preconfigured at the AMF (and possibly the gNB) during cell planning phase, for instance based on an estimation of cell coverage of the earth moving cells. Moreover, a mapping between cell and gNB may be preconfigured at the AMF. Accordingly, the AMF knows which gNB(s) cover the registration area at any time instance or time instant, and is therefore able to determine which gnB(s) to deliver the paging message to.

Furthermore, the UE signals to the AMF the cell ID of its last visited cell and a timestamp of the UE being located in the cell (e.g., a timestamp of the signal strength measurement) in the REGISTRATION REQUEST message.

Moreover, the Registration Area (and/or Tracking Area) is signaled to the gNB in terms of multiple sets of cells (corresponding to a plurality of lists of cell IDs) with associated timing (e.g., the respective time interval when one of the sets of cells forms the registration area), e.g., in the PAGING message (or in a paging request including the paging message). As a result, the gNB knows which cell(s) cover the Registration Area, and is able to determine which cells to broadcast the paging to.

Figure 28:
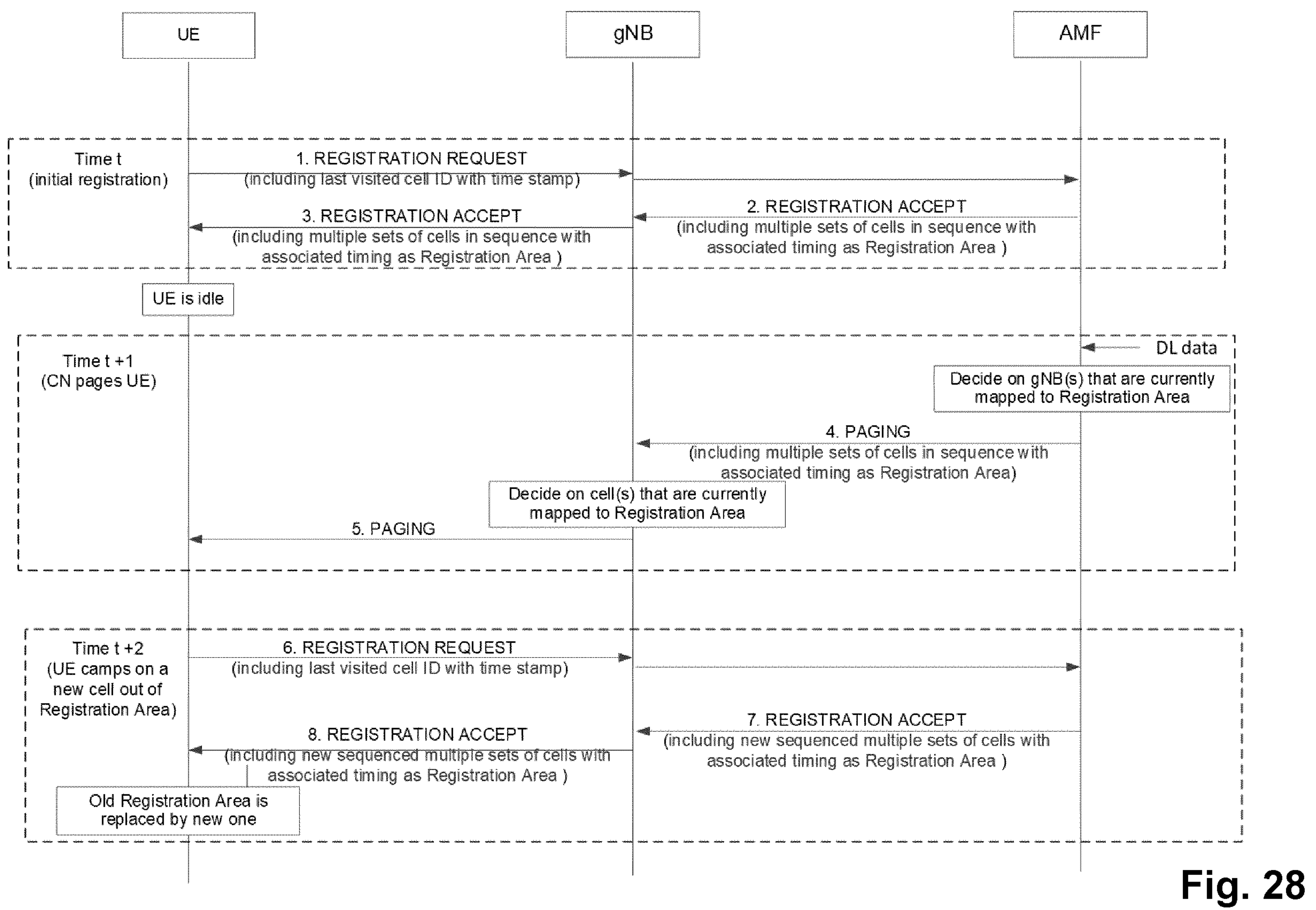
FIG. 28 illustrates registration and paging call flows.

Exemplary registration and paging call flows are shown in FIGS. 28. At time t, e.g., when initial registration of the UE is performed, the UE transmits a registration request indicating the last visited cell with a time stamp to the AMF. The UE then receives a registration accept message from the AMF, which includes, as an indication of the registration area, multiple sets of sells in sequence (e.g., a plurality of lists of cell IDs) and an associated timing which is a timing when one set of cells forms the registration area.

At time t+1, when the UE is to be paged by the core network, the AMF, which has receive DL data form the UE, decides on gNB(s) and on that are currently mapped to the registration area, and transmits a paging message (or paging request message including a paging message) to these gNBs including the multiple sets of cells in sequence with associated timing as the registration area. In principle, it is sufficient that a gNBs only receives the IDs of the cells which are served by the respective gNB. The gNB decides on cells that are currently mapped to the registration area, and performs paging of the UE At a time t+2, when the UE camps on a new cell out of the registration area, a registration request including the cell ID of the newly visited cell and a registration accept message including a new sequence of multiple sets of cells indicating the new registration area are exchanged between UE and AMF in a similar manner as at initial registration at time t.

When the UE is indicated the registration area as a plurality of lists of cell IDs of cell sets and associated timings when they form the registration area, it is not required that the UE is able to determine its location, and legacy cell selection based on radio strength can be reused. Nevertheless, rather than the cell ID of the last visited cell and the timestamp, a UE may alternatively transmit a location information in the registration request.

Furthermore, the TAC is not required to be broadcast by the moving cells. Therefore, issues related to TAC broadcast do not need to occur. Such issues may include TAC fluctuation due to "hard switch" or overhead due to soft switch.

Geographical Zone and Radio Signal Coverage

In some embodiments, the TA and/or the registration area, RA is defined by cell areas or "restricted cell areas" (corresponding to cell sections) with associated timing, where the "restricted cell area" is defined by the intersection of a geographical zone and radio signal coverage.

The geographical zones may be pre-installed to the UE (e.g., stored in a SIM or other memory device) and predefined in the network (gNB and core network). These geographical zones can be used to define, for example, a country boundary of an authorization area.

For instance, a satellite beam may broadcast multiple cell IDs (a cell ID may correspond to a cell as well as a cell section or "restricted cell area") which are associated with different cells possibly belonging to different countries or authorization areas. In this case, when performing cell (re)selection using signal strength, the UE may receive the same signal strength from the multiple cells or cell sections since they are generated by the same satellite beam. However, the multiple cells, or sections corresponding to "restricted cell areas," may be associated to the different authorization areas. For instance, a satellite beam moves over the Earth along a borderline of two countries and broadcasts two cell IDs respectively for both countries. In this disclosure, the "restricted cell IDs," each of which may have its own cell IDs, refer to cell sections of cells within one of the predefined geographical areas. The UE then selects the cell with the strongest radio strength that is allowed (or authorized) for the given location.

For instance, when the UE determines that it is not located in the registration area (e.g., by position measurement or by comparing a cell ID of a newly camped or visited cell (or a signal strength from a plurality of cell IDs) with a list of cell IDs defining the previous registration area for a given time interval), the UE may perform a signal strength measurement for cell (re)selection and receive the same or a similar signal strength from a plurality of cells, which therefore are candidates for the newly visited cell.

The UE may then determine, based on a location measurement and a definition of the geographical areas, which may be read from storage or memory, a geographical area out of the stored or pre-installed geographical areas in which the UE is located.

The UE then selects one candidate included in the geographical area in which the UE is located as the newly visited cell or cell section. This selection is performed based on an association between a cell ID of each of the plurality of candidates and one of stored geographical areas.

This association between a cell ID and a geographical area (e.g., a mapping between cell ID and geographical zone info) may be signaled to the UE for each cell from a gNB within system information (e.g., SIB) which the UE has received.

In addition, the installed or stored geographical areas may also be used by the UE to determine which of the cells included in the list of cell IDs or the plurality of lists of cell IDs are within the geographical area, e.g., if the list of cell IDs indicated by the AMF extends beyond the restricted geographical area. The UE circuitry 1790 may then determine the registration area to be formed by the cells or cell sections from the list(s) of cell IDs that are associated with the geographical area where the UE is located.

An example of a plurality of cell sections or "restricted cell areas" being divided among different geographical areas or zones is shown in FIG. 29. Therein, it may be assumed that one satellite beam transmits multiple (e.g., two or more) cell IDs, e.g., beam 1 covers both cell 1 and cell 2. Since both cells or restricted cell areas are in the same radio coverage, the UE detects a similar (e.g., substantially the same) radio signal strength from both cells associated with the same radio satellite beam. The UE may select restricted cell area (RCA) 1 or RCA 2 based on a location info on whether the UE is located in zone A or in zone B, where RCA 1=intersection {cell 1, zone A}, and RCA 2=intersection {cell 2, zone B}. Different tracking areas or registration areas may be indicated by signaling lists of pluralities of cell IDs (or RCA IDs or cell section IDs) and the associated timings or time intervals:

- TA 1 (or RA 1) = {13:01-13:10 RCA 1, RCA 3, RCA 5; 13:11-13:20 RCA 3, RCA 5, RCA 7};
- TA 2 (or RA 2) = {13:01-13:10 RCA 2, RCA 4, RCA 6; 13:11-13:20 RCA 4, RCA 6, RCA 8}

As mentioned above, the geographical zone or area definition may be stored or installed in the UE or a memory device. Furthermore, the association between cell IDs (or RCA IDs) and geographical zone may be broadcast by gNB, e.g., via SIB. The registration area, in terms of multiple sets of cells in sequence with associated timing is signaled from AMF to UE via NAS signaling (e.g., registration accept message), similar to the above description of the embodiments entitled "Cells with respective timing."

As a result, the UE performs cell (re) selection from both location info and radio signal strength, and is able to determine from the camped cell ID and the timing whether the UE moves out of the registration area.

Aspects of signaling to the AMF system and to the gNB may be similar to the above description in section "Cells with respective timing." The cell coverage area info (including the mapping to the gNB may be configured or pre-configured in the AMF (and gNB) during cell planning phase. The UE signals a last visited cell with a timestamp, or a location info to the AMF in the registration request message. Moreover, the TA and/or registration area definition is signaled to the gNB in terms of multiple sets of cells (lists of cell IDs/RCA IDs) in sequence with associated timing, e.g., in the paging message or in a paging request message which also includes the paging message to be sent to the UE.

As a result, the AMF knows which gNBs cover the Registration area at any time instance and is able to determine to which gNBs it has to deliver the paging message (or paging request message). Moreover, the gNB knows which cell(s) cover the Registration Area and is thus able to determine in which cells the paging is to be broadcast.

Figure 30:
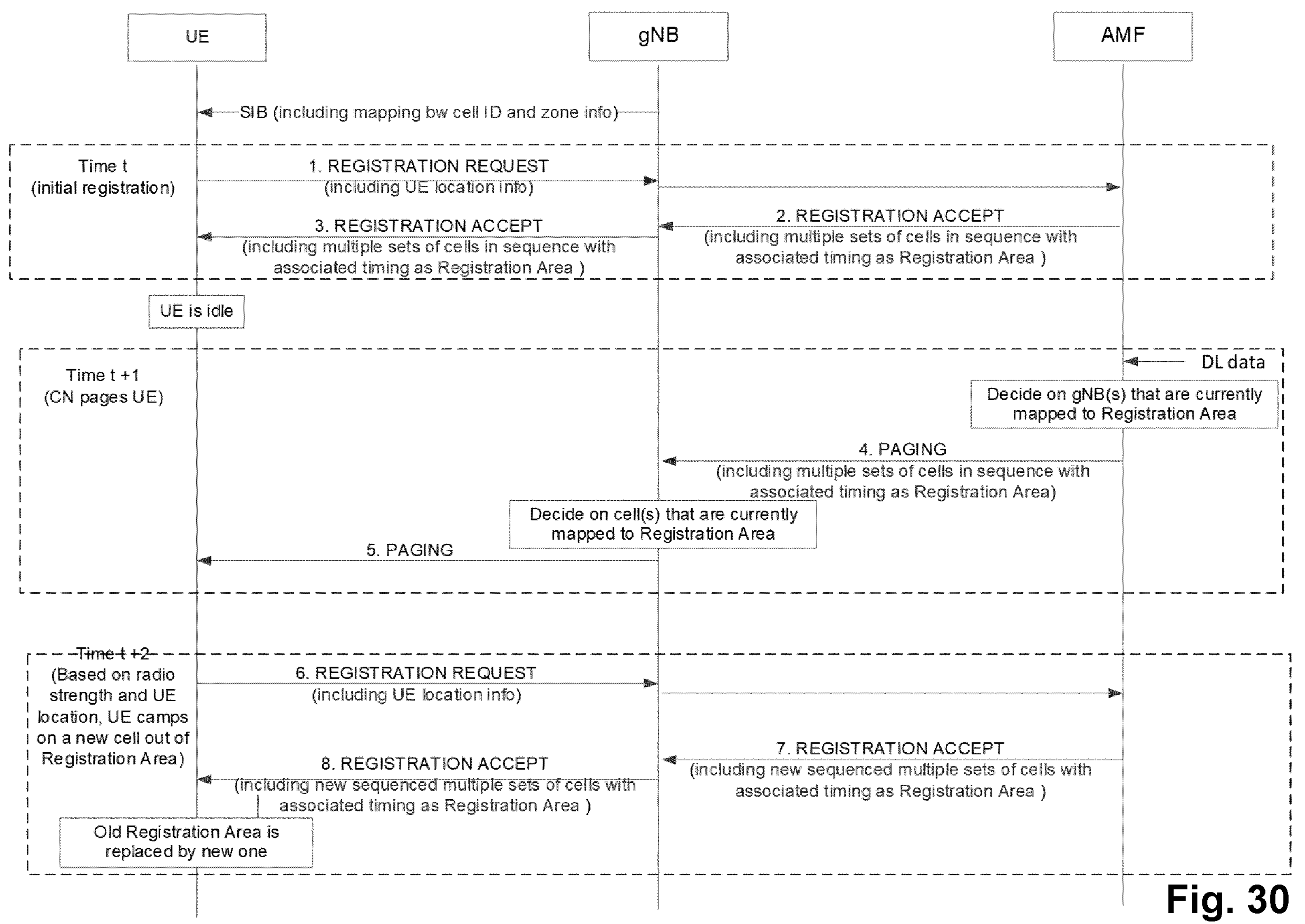
FIG. 30 illustrates registration and paging call flows.

Registration and paging call flows between UE, gNB and AMF are shown in FIG. 30. As mentioned above, the UE receives a SIB transmitted from a gNB, which includes the mapping between cell ID (RCA ID) and zone info. Furthermore, although it is shown that the UE transmits location information in the registration request (steps 1 and 6), the UE may also transmit a cell ID and an associated timing. Moreover, at timing t+2, the UE camps on a new cell outside the Registration Area, which is selected or determined based on radio strength and UE location (e.g., for determining in which zone or geographical area the UE is located). Further flows shown in FIG. 30 are similar to the above description of the flows shown in FIG. 28.

As described in this section, the accessibility of a cell is controlled using additional location information in addition to a received signal strength. In case multiple cells or cell sections are transmitted by the same satellite, this additional use of location information to control the accessibility of the cell may facilitate reducing the number of cells in the registration area and reduce paging overhead.

As described above, the UE may perform cell (re) selection, e.g., selection of a newly visited cell within or outside the registration area, based either on location information (e.g., position measurement such as GNSS) or based on signal strength measurement. For instance, if a location information is used to determine whether the UE is still within the registration area, cell selection may also be location based, which may facilitate reducing signal strength measurement. On the other hand, the determination whether the UE is within the registration area via signal strength may be practical for UEs that are not capable of positioning or have their positioning function turned off.

Furthermore, as can be seen in FIGS. 26, 28, and 30, when the circuitry determines that the UE is not located in the registration area, it transmits a registration request including at least one of an indication of the UE location, or a cell ID of the newly visited cell and a timestamp indicating the time instant at which the UE is located (e.g., has measured the signal strength) within the newly visited cell.

On the other hand, when the UE is within the registration area, and DL data is available for the UE, the UE receives paging (e.g., one or both of a paging DCI and a paging message) transmitted by the gNB (or gNBs) within the registration area.

The one or more base stations (e.g., gNBs) which perform paging of the UE are determined by the AMF system. In particular, in some embodiments, the AMF determined base stations currently mapped to the registration area (which has already been indicated to the UE via registration accept), and transmits a paging request message to the one or more base stations. The paging request message includes:

the list of cell IDs of the plurality of earth moving cells or cell sections and the indication of the second time instant, or the list of cell IDs and the indication of the time interval when the first plurality of earth moving cells or cell sections form the registration area, or the list of tracking areas forming the registration area.

For instance, the paging request message may further include the paging message.

As described above, it can be seen from the embodiments of the present disclosure that there is no need to broadcast a TA code (TAC) within cell system information to be capable of indicating the registration area to the UEs. Thus, issues concerning moving tracking areas, as related, e.g., to "hard switch" and "soft switch," may be alleviated or circumvented. Specifically, for the embodiments described with reference to FIGS. 22 to 30, a TA code may not be needed at all.

Moreover, each of the above-named embodiments illustrated in FIGS. 22 to 30 includes timing information for defining the tracking area and the registration area (e.g., a time instance defining "frozen" cells or time intervals at which respective cells cover the registration area). With such timing information, the movement of cells is known at the gNB and at the core network in a predictable way. Furthermore, in the embodiments described in the section entitled "Cell coverage areas at time instant" the ephemeris data is also available at the UE, which may use it to determine the registration area and possibly for cell (re)selection.

As described above, the examples and embodiments of the present disclosure have been presented using Registration Area management for a RRC idle UE as an example. However, the present disclosure can also be applied to RAN Notification Area (RNA) management for inactive UEs. The RAN Notification Area is the basis for device tracking on RAN level. RAN Notification Area update is managed by RRC RAN Notification Area Update transmitted from UE to gNB. The change of the Tracking Area implies a change of the RNA, and therefore an RRC RAN Notification Area Update is performed implicitly every time the UE makes a registration update as described above.

The present disclosure can be realized by software, hardware, or software in cooperation with hardware. Each functional block used in the description of each embodiment described above can be partly or entirely realized by an LSI (large scale integration) such as an integrated circuit (IC), and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

In summary, a user equipment, UE, is provided in a first embodiment, comprising: a transceiver, which, in operation, transmits a registration request including at least one of:

an indication of a first location of the UE, or a cell ID of a last cell that has been visited by the UE and a timestamp indicating a first time instant at which the UE has been located within the last cell, and receives a registration accept message including an indication of a registration area, the registration area including the first location of the UE, and circuitry, which, in operation, determines, based on:

a list of cell IDs of a plurality of earth moving cells or cell sections of the earth moving cells, an indication of a second time instant when the plurality of earth moving cells form the registration area, coverage area information indicating, for each of the plurality of earth moving cells, a coverage area of the cell or cell section relative to a satellite location of a satellite generating the cell and ephemeris data of the satellite, and a measurement of a second location of the UE, wherein the list of the plurality of earth moving cells and the indication of the second time instant are included in the indication of the registration area, or the list of cell IDs, an indication of a time interval when the plurality of earth moving cells or cell sections form the registration area, and a cell ID of a newly visited cell or cell section including the second location of the UE and different from the last cell, wherein the list of cell IDs and the indication of the time interval are included in the indication of the registration area, or the measurement of the second location and a mapping between geographical areas and tracking areas and a list of one or more tracking areas forming the registration area, wherein the mapping is read from a storage, and the list of one or more tracking areas is included in the indication of the registration area, whether or not the UE is located in the registration area at the second location.

In a second embodiment, in addition to the first embodiment, the transceiver, in operation, receives the coverage area information within system information.

In a third embodiment, in addition to the first or second embodiments, the coverage area information includes, for each of the plurality of earth moving cells:

a satellite beam direction of each beam forming the cell and a radius or diameter of the coverage area, or a polygon defining the coverage area in a non-overlapping manner, or a center and a radius of the coverage area.

In a fourth embodiment, in addition to the first embodiment, the indication of the registration area includes a plurality of lists of cell IDs of earth moving cells or cell sections of earth moving cells including said list of cell IDs, and a plurality of indications of time intervals including said time interval respectively indicating, for each of the plurality of lists of cell IDs, the time interval when the earth moving cells or cell sections respectively indicated by the list of cell IDs, form the registration area.

In a fifth embodiment, in addition to the first or fourth embodiments, when the circuitry determines that the UE is not located in the registration area at the second location, and a received signal strength of a plurality of candidates for the newly visited cell or cell section is substantially the same, the circuitry, in operation, determines, based on the measurement of the second location and a definition of the geographical areas read from a storage, a geographical area from among the geographical areas in which the UE is located, and selects, based on an association between a cell ID of each of the plurality of candidates and one of the geographical areas included in system information, a candidate included in the geographical area in which the UE is located as the newly visited cell or cell section.

In a sixth embodiment, in addition to any of the first to fifth embodiments, the circuitry, in operation, selects the newly visited cell based on the second location.

In a seventh embodiment, in addition to the first, fourth, or fifth embodiments, the circuitry, in operation, selects the newly visited call based on a signal strength measurement.

In an eighth embodiment, in addition to any of the first to seventh embodiments, the transceiver, in operation, receives a paging message within the registration area.

In a ninth embodiment, in addition to any of the first to eighth embodiments, if the circuitry determines that the UE is not located in the registration area at the second location, the transceiver, in operation transmits a second registration request including at least one of:

an indication of the second location of the UE, or a cell ID of the newly visited cell and a timestamp indicating a third time instant at which the UE has been located within the newly visited cell.

A base station is provided in a tenth embodiment, comprising an interface which, in operation, receives a paging request message to page a user equipment, UE, including an indication of a registration area, circuitry, which, in operation, determines, based on:

a list of cell IDs of a first plurality of earth moving cells or cell sections of the earth moving cells, an indication of a time instant when the first plurality of earth moving cells form the registration area, and coverage area information indicating, for each of the first plurality of earth moving cells, a coverage area of the cell or cell section relative to a satellite location of a satellite generating the cell and ephemeris data of the satellite, wherein the list of the first plurality of earth moving cells and the indication of the time instant are included in the indication of the registration area, or the list of cell IDs and an indication of a time interval when the first plurality of earth moving cells or cell sections form the registration area, wherein the list of cell IDs and the indication of the time interval are included in the indication of the registration area, or a mapping between geographical areas and tracking areas and a list of one or more tracking areas forming the registration area, wherein the mapping is read from a storage and the list of one or more tracking areas is included in the indication of the registration area, a second plurality of earth moving cells currently mapped to the registration area; and a transceiver, which, in operation, transmits a paging message for paging the UE in the second plurality of cells.

An access and mobility management function, AMF, system is provided in an eleventh embodiment, comprising an interface, which, in operation, receives a registration request of a user equipment, UE, including:

an indication of a first location of the UE, or a cell ID of a last cell that has been visited by the UE and a timestamp indicating a first time instant at which the UE has been located within the last cell, and circuitry which, in operation, generates an indication of a registration area including the first location of the UE, the indication of the registration area including:

a list of cell IDs of a plurality of earth moving cells or cell sections of the earth moving cells, an indication of a second time instant when the plurality of earth moving cells form the registration area, wherein the registration area is determined based on coverage area information indicating, for each of a plurality of earth proving cells or cell sections, a coverage area of the cell or cell section relative to a satellite location of a satellite generating the cell and ephemeris data of the satellite, or the list of cell IDs and an indication of a time interval when the plurality of earth moving cells or cell sections form the registration area, or a list of one or more tracking areas forming the registration area, wherein the list of one or more tracking areas is determined based on a mapping between geographical areas and tracking areas, the mapping being read from a storage, wherein the interface, in operation, transmits a registration accept message including the indication of the registration area.

In a twelfth embodiment, in addition to the eleventh embodiment, the circuitry, in operation, determines one or more base stations currently mapped to the registration area, and the interface, in operation, transmits a paging request message to the one or more base stations, the paging request message including:

the list of cell IDs of the plurality of earth moving cells or cell sections and the indication of the second time instant, or the list of cell IDs and the indication of the time interval when the first plurality of earth moving cells or cell sections form the registration area, or the list of tracking areas forming the registration area.

A communication method for a user equipment, UE, is provided in a thirteenth embodiment, comprising transmitting a registration request including at least one of:

an indication of a first location of the UE, or a cell ID of a last cell that has been visited by the UE and a timestamp indicating a first time instant at which the UE has been located within the last cell; and determining, based on:

a list of cell IDs of a plurality of earth moving cells or cell sections of the earth moving cells, an indication of a second time instant when the plurality of earth moving cells form the registration area, coverage area information indicating, for each of the plurality of earth moving cells, a coverage area of the cell or cell section relative to a satellite location of a satellite generating the cell and ephemeris data of the satellite, and a measurement of a second location of the UE, wherein the list of the plurality of earth moving cells and the indication of the second time instant are included in the indication of the registration area, or the list of cell IDs, an indication of a time interval when the plurality of earth moving cells or cell sections form the registration area, and a cell ID of a newly visited cell or cell section including the second location of the UE and different from the last cell, wherein the list of cell IDs and the indication of the time interval are included in the indication of the registration area, or the measurement of the second location and a mapping between geographical areas and tracking areas and a list of one or more tracking areas forming the registration area, wherein the mapping is read from a storage, and the list of one or more tracking areas is included in the indication of the registration area, whether or not the UE is located in the registration area at the second location.

A communication method for a base station is provided in a fourteenth embodiment, comprising receiving a paging request message to page a user equipment, UE, including an indication of a registration area; determining, based on:

a list of cell IDs of a first plurality of earth moving cells or cell sections of the earth moving cells, an indication of a time instant when the first plurality of earth moving cells form the registration area, and coverage area information indicating, for each of the first plurality of earth moving cells, a coverage area of the cell or cell section relative to a satellite location of a satellite generating the cell and ephemeris data of the satellite, wherein the list of the first plurality of earth moving cells and the indication of the time instant are included in the indication of the registration area, or the list of cell IDs and an indication of a time interval when the first plurality of earth moving cells or cell sections form the registration area, wherein the list of cell IDs and the indication of the time interval are included in the indication of the registration area, or a mapping between geographical areas and tracking areas and a list of one or more tracking areas forming the registration area, wherein the mapping is read from a storage and the list of one or more tracking areas is included in the indication of the registration area, a second plurality of earth moving cells currently mapped to the registration area; and transmitting a paging message for paging the UE in the second plurality of cells.

A communication method for an access mobility function, AMF, is provided in a fifteenth embodiment, comprising receiving a registration request of a user equipment, UE, including:

an indication of a first location of the UE, or a cell ID of a last cell that has been visited by the UE and a timestamp indicating a first time instant at which the UE has been located within the last cell;

generating an indication of a registration area including the first location of the UE, the indication of the registration area including:

a list of cell IDs of a plurality of earth moving cells or cell sections of the earth moving cells, an indication of a second time instant when the plurality of earth moving cells form the registration area, wherein the registration area is determined based on coverage area information indicating, for each of a plurality of earth moving cells or cell sections, a coverage area of the cell or cell section relative to a satellite location of a satellite generating the cell and ephemeris data of the satellite, or the list of cell IDs and an indication of a time interval when the plurality of earth moving cells or cell sections form the registration area, or a list of one or more tracking areas forming the registration area, wherein the list of one or more tracking areas is determined based on a mapping between geographical areas and tracking areas, the mapping being read from a storage; and transmitting a registration accept message including the indication of the registration area.

It is noted that the second to ninth embodiments are correspondingly applicable to the base station of the tenth embodiment and the AMF system of the eleventh embodiment, and that the twelfth embodiment is correspondingly applicable to the base station of the tenth embodiment. Moreover, the steps performed by the circuitry in operation, the steps performed by the transceiver in operation, as, well as the steps performed by the interface in operation referred to in the above UE, base station and AMF embodiments correspond to the respective methods.

In addition, a non-transitory medium is provided storing program instructions which, when executed on a processing circuitry such as a general purpose processor, cause the processing circuitry to perform all steps of the above mentioned method embodiments.

Further provided is an integrated circuit for a communication apparatus such as a UE, base station, or AMF system, which controls the communication apparatus to perform all steps of the above mentioned method embodiments.

Summarizing, provided are a user equipment (UE), a base station, an AMF (Access and Mobility Management Function) system and corresponding methods. The UE determines, based on a signal strength measurement or a position in combination with either of a list of cell IDs of earth moving cells and a timing or a stored mapping between geographical areas and tracking areas whether the UE is located in a registration area that has been indicated to the UE by the AMF and in which the UE is paged by the base station.

The invention claimed is:

1. A user equipment, UE, comprising:

a transceiver, which, in operation, transmits a registration request including an indication of a first location of the UE, the indication of the first location being stored in the UE, and receives a registration accept message including a list of one or more tracking areas forming a registration area, the list of one or more tracking areas including the indication of the first location of the UE, and circuitry, which, in operation, determines, based on an indication of a second location of the UE and the list of one or more tracking areas corresponding to a plurality of prestored geographical areas, whether or not the UE is located in the registration area at the second location, the one or more tracking areas of the list corresponding to one or more cell IDs of earth moving cells forming the registration area per each time interval such that the registration area for the UE need not be updated each time the earth moving cells, which constitute the registration area, change, wherein the circuitry, when determining that the UE is not located in the registration area at the second location and when received signal strengths of a plurality of candidate cells for a newly visited cell are substantially the same, determines, based on a measurement of the second location, a geographical area in which the UE is located out of the plurality of prestored geographical areas, and selects one candidate cell included in the determined geographical area as the newly visited cell, wherein the registration request includes a cell ID of a last cell that has been visited by the UE and a timestamp indicating a first time instant at which the UE has been located within the last cell, and the circuitry, in operation, determines whether or not the UE is located in the registration area at the second location based on:

a list of cell IDs of the earth moving cells or cell sections of the earth moving cells, an indication of a second time instant when the earth moving cells form the registration area, coverage area information indicating, for each of the earth moving cells, a coverage area of the cell or cell section relative to a satellite location of a satellite generating the cell and ephemeris data of the satellite, and the measurement of the second location of the UE, wherein the list of cell IDs of the earth moving cells and the indication of the second time instant are included in an indication of the registration area, wherein the indication of the registration area includes:

a plurality of lists of cell IDs of the earth moving cells or cell sections of the earth moving cells including said list of cell IDs, and a plurality of indications of time intervals including said time interval respectively indicating, for each of the plurality of lists of cell IDs, the time interval when the earth moving cells or cell sections respectively indicated by the list of cell IDs, form the registration area, wherein the plurality of lists of cell IDs with the associated time intervals define the registration area itself as time-indexed frozen sets of earth moving cells.

2. The UE according to claim 1, wherein the transceiver, in operation, receives the coverage area information within system information.

3. The UE according to claim 1, wherein the coverage area information includes, for each of the earth moving cells:

a satellite beam direction of each beam forming the cell and a radius or diameter of the coverage area, or a polygon defining the coverage area in a non-overlapping manner, or a center and a radius of the coverage area.

4. The UE according to claim 1, wherein the transceiver, in operation, receives a paging message within the registration area.

5. The UE according to claim 1, wherein, if the circuitry determines that the UE is not located in the registration area at the second location, the transceiver, in operation, transmits a second registration request including at least one of:

an indication of the second location of the UE, or a cell ID of the newly visited cell and a timestamp indicating a third time instant at which the UE has been located within the newly visited cell.

6. A communication method for a user equipment, UE, comprising:

transmitting a registration request including an indication of a first location of the UE;

storing the indication of the first location in the UE;

receiving a registration accept message including a list of one or more tracking areas forming a registration area, the list of one or more tracking areas including the indication of the first location of the UE;

determining, based on an indication of a second location of the UE and the list of one or more tracking areas corresponding to a plurality of prestored geographical areas, whether or not the UE is located in the registration area at the second location, the one or more tracking areas of the list corresponding to one or more cell IDs of earth moving cells forming the registration area per each time interval such that the registration area for the UE need not be updated each time the earth moving cells, which constitute the registration area, change;

when determining that the UE is not located in the registration area at the second location and when received signal strengths of a plurality of candidate cells for a newly visited cell are substantially the same, determining, based on a measurement of the second location, a geographical area in which the UE is located out of the plurality of prestored geographical areas, and selecting one candidate cell included in the determined geographical area as the newly visited cell;

wherein the registration request includes a cell ID of a last cell that has been visited by the UE and a timestamp indicating a first time instant at which the UE has been located within the last cell; and determining whether or not the UE is located in the registration area at the second location based on:

a list of cell IDs of the earth moving cells or cell sections of the earth moving cells, an indication of a second time instant when the earth moving cells form the registration area, coverage area information indicating, for each of the earth moving cells, a coverage area of the cell or cell section relative to a satellite location of a satellite generating the cell and ephemeris data of the satellite, and the measurement of the second location of the UE, wherein the list of cell IDs of the earth moving cells and the indication of the second time instant are included in an indication of the registration area;

wherein the indication of the registration area includes:

a plurality of lists of cell IDs of the earth moving cells or cell sections of the earth moving cells including said list of cell IDs, and a plurality of indications of time intervals including said time interval respectively indicating, for each of the plurality of lists of cell IDs, the time interval when the earth moving cells or cell sections respectively indicated by the list of cell IDs, form the registration area, wherein the plurality of lists of cell IDs with the associated time intervals define the registration area itself as time-indexed frozen sets of earth moving cells.

* * * * *